US010559068B2

(12) United States Patent
Kishine

(10) Patent No.: US 10,559,068 B2
(45) Date of Patent: Feb. 11, 2020

(54) IMAGE PROCESSING DEVICE, IMAGE PROCESSING METHOD, AND PROGRAM PROCESSING IMAGE WHICH IS DEVELOPED AS A PANORAMA

(71) Applicant: FUJIFILM Corporation, Tokyo (JP)

(72) Inventor: Yasunobu Kishine, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/920,755

(22) Filed: Mar. 14, 2018

(65) Prior Publication Data
US 2018/0204311 A1 Jul. 19, 2018

Related U.S. Application Data

(63) Continuation of application No. PCT/JP2016/074458, filed on Aug. 23, 2016.

(30) Foreign Application Priority Data

Sep. 29, 2015 (JP) .................. 2015-191075

(51) Int. Cl.
G06T 5/50 (2006.01)
G06T 5/00 (2006.01)
(Continued)

(52) U.S. Cl.
CPC .............. G06T 5/006 (2013.01); G06T 3/005 (2013.01); G06T 5/50 (2013.01); H04N 5/23238 (2013.01); G06T 2207/10004 (2013.01)

(58) Field of Classification Search
CPC ....... G06T 5/006; G06T 3/0062; G06T 3/005; G06T 5/50; G06T 2207/10004;
(Continued)

(56) References Cited

U.S. PATENT DOCUMENTS 9,134,126 B2 * 9/2015 Kimura .................... G01C 3/32
2004/0169724 A1 * 9/2004 Ekpar ................... G06T 3/0062
348/36
(Continued)

FOREIGN PATENT DOCUMENTS

CN 102289048 A 12/2011
JP 9-91442 A 4/1997
(Continued)

OTHER PUBLICATIONS

Bieniarz et al, Hyperspectral resolution enhancement using multisensor image data (Year: 2015).*
(Continued)

Primary Examiner — Shan E Elahi
(74) Attorney, Agent, or Firm — Birch, Stewart, Kolasch & Birch, LLP

(57) ABSTRACT

The present invention provides an image processing device, an image processing method, and a program capable of suppressing the calculation load of processing of enhancing mutually different resolutions for each of a sagittal direction and a tangential direction of a lens. In the aspect of the present invention, the image processing device 35 includes: an image acquisition section 40 that acquires a first image which is acquired from an imaging element by imaging a subject image using an optical system; a second image generation section 41 that generates a second image which is developed as a panorama by performing polar coordinate transformation on the first image acquired by the image acquisition section; and a resolution enhancement processing section 42 that performs resolution enhancement processing on the second image asymmetrically in a horizontal direction and a vertical direction of the second image.

12 Claims, 18 Drawing Sheets

(51) Int. Cl.
*G06T 3/00* (2006.01)
*H04N 5/232* (2006.01)

(58) Field of Classification Search
CPC .. H04N 5/35721; H04N 5/3572; H04N 5/217; H04N 5/23238
USPC .......................................................... 348/36
See application file for complete search history.

(56) References Cited

U.S. PATENT DOCUMENTS

| | | | |
|---|---|---|---|
| 2011/0043666 A1 | 2/2011 | Mitsumoto | |
| 2011/0129166 A1 | 6/2011 | Nishiyama | |
| 2011/0142366 A1* | 6/2011 | Young | G06T 3/4069 382/274 |
| 2011/0150331 A1* | 6/2011 | Young | G06T 3/4015 382/167 |
| 2011/0285879 A1 | 11/2011 | Hatakeyama | |
| 2011/0304764 A1* | 12/2011 | Shigemitsu | G02B 13/0035 348/345 |
| 2012/0169842 A1* | 7/2012 | Chuang | G08B 13/19619 348/39 |
| 2012/0242784 A1 | 9/2012 | Ogasahara | |
| 2013/0027757 A1* | 1/2013 | Lee | H04N 1/387 358/450 |
| 2013/0089272 A1 | 4/2013 | Oikawa et al. | |
| 2013/0229540 A1* | 9/2013 | Farina | H04N 9/045 348/218.1 |
| 2013/0341493 A1* | 12/2013 | Ando | G01C 3/32 250/208.1 |
| 2014/0160266 A1* | 6/2014 | Wereley | G02B 21/365 348/79 |
| 2014/0198231 A1 | 7/2014 | Itoh | |
| 2014/0340570 A1* | 11/2014 | Meyers | H04N 5/211 348/370 |
| 2015/0146046 A1 | 5/2015 | Ogasahara et al. | |
| 2016/0080647 A1* | 3/2016 | Kimura | H04N 1/3876 348/36 |
| 2016/0148062 A1* | 5/2016 | Fursich | H04N 13/239 348/36 |

FOREIGN PATENT DOCUMENTS

| | | |
|---|---|---|
| JP | 2003-108998 A | 4/2003 |
| JP | 2004-328506 A | 11/2004 |
| JP | 2008-209134 A | 9/2008 |
| JP | 2011-44825 A | 3/2011 |
| JP | 2011-119802 A | 6/2011 |
| JP | 2012-53740 A | 3/2012 |
| JP | 2012-204856 A | 10/2012 |
| JP | 2013-84156 A | 5/2013 |
| JP | 2014-138196 A | 7/2014 |
| JP | 2015-46171 A | 3/2015 |
| JP | 2015-103971 A | 6/2015 |
| WO | WO 2011/121763 A1 | 10/2011 |

OTHER PUBLICATIONS

Tian et al, Bayesian stereoscopic image resolution enhancement (Year: 2011).*
Messing et al, Improved multi-image resolution enhancement for colour images captured by single-CCD cameras (Year: 2000).*
International Search Report and English translation (Form PCT/ISA/210) for Application No. PCT/JP2016/074458, dated Nov. 1, 2016.
Japanese Decision to Grant a Patent and English translation for Application No. 2017-543015, dated May 2, 2018.
Written Opinion of the International Searching Authority and English translation of the International Preliminary Report on Patentability (Forms PCT/IPEA/409 and PCT/ISA/237) for Application No. PCT/JP2016/074458, dated Nov. 1, 2016.
Office Action dated Oct. 8, 2019 in counterpart Chinese Patent Application No. 201680056429.X, with English translation.

* cited by examiner

FIG. 5
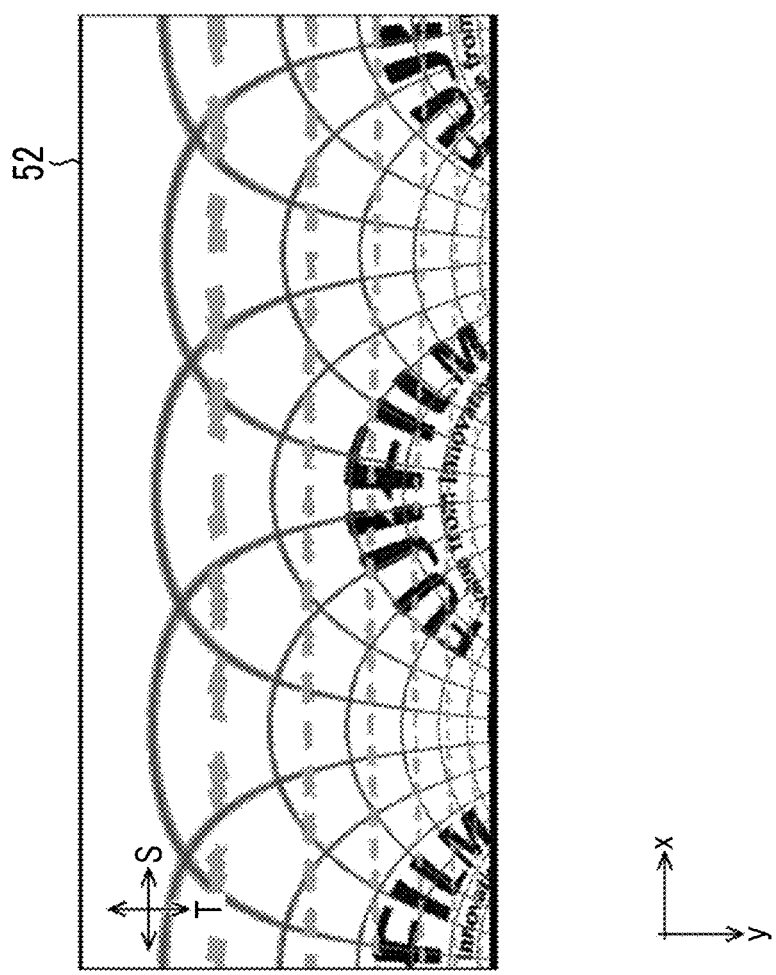
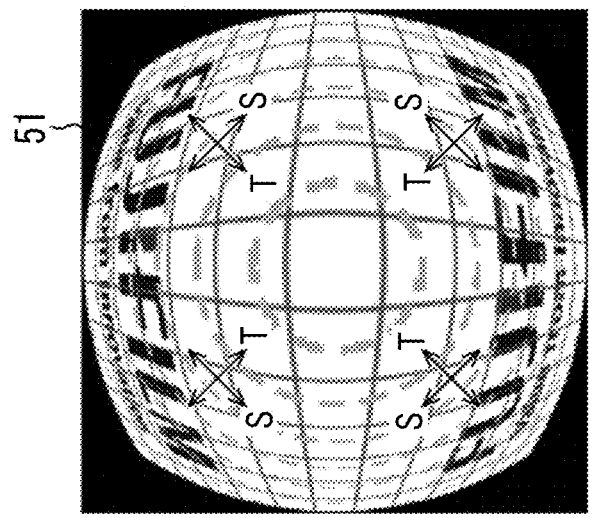

| 0 | −0.002 | −0.004 | −0.005 | −0.004 | −0.002 | 0 |
|---|---|---|---|---|---|---|
| −0.001 | −0.001 | −0.004 | 0.029 | −0.004 | −0.001 | −0.001 |
| −0.004 | −0.004 | −0.092 | −0.311 | −0.092 | −0.004 | −0.004 |
| −0.005 | 0.029 | −0.311 | 2.344 | −0.311 | 0.029 | −0.005 |
| −0.004 | −0.004 | −0.092 | −0.311 | −0.092 | −0.004 | −0.004 |
| −0.001 | −0.001 | −0.004 | 0.029 | −0.004 | −0.001 | −0.001 |
| 0 | −0.002 | −0.004 | −0.005 | −0.004 | −0.002 | 0 |

| 0 | 0 | 0.07 | 0 | 0 |
|---|---|---|---|---|
| 0 | 0 | −0.4 | 0 | 0 |
| 0.03 | −0.2 | 2 | −0.2 | 0.03 |
| 0 | 0 | −0.4 | 0 | 0 |
| 0 | 0 | 0.07 | 0 | 0 |

IMAGE PROCESSING DEVICE, IMAGE PROCESSING METHOD, AND PROGRAM PROCESSING IMAGE WHICH IS DEVELOPED AS A PANORAMA

CROSS-REFERENCE TO RELATED APPLICATIONS

The present application is a Continuation of PCT International Application No. PCT/JP2016/074458 filed on Aug. 23, 2016 claiming priority under 35 U.S.C. § 119(a) to Japanese Patent Application No. 2015-191075 filed on Sep. 29, 2015. Each of the above applications is hereby expressly incorporated by reference, in their entirety, into the present application.

BACKGROUND OF THE INVENTION

I. Field of the Invention

The present invention relates to an image processing device, an image processing method, and a program, and in particular, to an image processing device, an image processing method, and a program capable of performing image processing on a panoramic developed image.

2. Description of the Related Art

The resolution of a captured image, which is captured through an optical system, may be lowered due to the optical system. As one method of suppressing the lowering of the resolution, there is processing (resolution enhancement processing) of enhancing the resolution by performing image processing on the captured image.

As the resolution enhancement processing, processing (recovery processing) of recovering the lowered resolution through a point spread function (PSF), which is a function indicating a response for a point light source of the optical system, and outline enhancement processing of enhancing the outline of a subject image are known.

A technique of performing panorama development by performing polar coordinate transformation on a captured image is known. For example, composition of an image is converted by performing panorama development on an image which is captured trough a fish-eye lens or a wide-angle lens of which the angle of view used for security applications, medical applications, and the like is greater than 180°.

For example, JP2012-204856A proposes a technique of correcting deviation caused by individual differences of lenses and distortion of coordinate axes based on characteristics of a lens with respect to a captured image, which is captured using a fish-eye lens, and thereafter performing processing for enhancing (restoring) the resolution of the captured image.

In addition, for example, JP2015-46171A discloses a technique for generating and displaying a planar image from the entire celestial sphere image.

SUMMARY OF THE INVENTION

Generally, since lenses have different resolutions in the sagittal direction and the tangential direction, it is preferable to perform resolution enhancement processing differently in the sagittal direction and the tangential direction of the lenses. However, the relationship between positions in the sagittal direction and the tangential direction of the lens and the horizontal direction and the vertical direction of the captured image changes in accordance with the position of the captured image. Therefore, resolution enhancement processing is performed differently in the sagittal direction and the tangential direction of the lens. This causes a large load on calculation processing.

In the technique described in JP2012-204856A mentioned above, there is no mention about the relationship between positions in the sagittal direction and the tangential direction of the lens and the horizontal direction and the vertical direction of the captured image in a case of performing the resolution enhancement processing.

In addition, JP2015-46171A does not mention resolution enhancement processing.

The present invention has been made in consideration of the above-mentioned situations, and an object of the present invention is to provide an image processing device, an image processing method, and a program capable of suppressing a calculation load of processing of enhancing mutually different resolutions for each of the sagittal direction and the tangential direction of the lens.

In order to achieve the object, an image processing device according to a first aspect of the present invention comprises: an image acquisition section that acquires a first image which is acquired from an imaging element by imaging a subject image using an optical system; a second image generation section that generates a second image which is developed as a panorama by performing polar coordinate transformation on the first image acquired by the image acquisition section; and a resolution enhancement processing section that performs resolution enhancement processing on the second image asymmetrically in a horizontal direction and a vertical direction of the second image.

According to the present aspect, the resolution enhancement processing is performed, asymmetrically in the horizontal direction and the vertical direction of the second image, on the second image which is acquired by performing panorama development on the first image and in which the sagittal direction and the tangential direction of the optical system and the horizontal direction and the vertical direction of the image are aligned. Thereby, according to the present aspect, it is possible to suppress the calculation load of the resolution enhancement processing asymmetrically in the horizontal direction and the vertical direction of the second image.

Preferably, the resolution enhancement processing, which is performed by the resolution enhancement processing section, is recovery processing using a recovery filter corresponding to the second image on the basis of a point spread function of the optical system.

According to the present aspect, recovery processing, which uses the recovery filter designed on the basis of the point spread function of the optical system and designed in accordance with the directions of the second image, is performed on the second image in which the sagittal direction and the tangential direction of the optical system and the horizontal direction and the vertical direction of the image are aligned. Thereby, according to the present aspect, it is possible to prevent the design of the recovery filter from becoming complicated and perform efficient recovery processing in which the calculation load of the recovery processing is reduced.

Preferably, the resolution enhancement processing, which is performed by the resolution enhancement processing section, is outline enhancement processing using an outline enhancement filter.

According to the present aspect, the outline enhancement processing, which uses the outline enhancement filter, is performed on the second image in which the sagittal direction and the tangential direction of the optical system and the horizontal direction and the vertical direction of the image are aligned. Thereby, according to the present aspect, it is possible to prevent the design of the outline enhancement filter from becoming complicated and perform efficient recovery processing in which the calculation load of the recovery processing is reduced.

Preferably, a lens composing the optical system is a fish-eye lens.

According to the present aspect, since a fish-eye lens is used as the optical system, it is possible to perform the resolution enhancement processing on the image which is captured at a wide angle.

Preferably, the image processing device further comprises a distortion correction section that performs distortion correction on the second image, and the resolution enhancement processing section performs resolution enhancement processing on the second image, which is subjected to the distortion correction, asymmetrically in a horizontal direction and a vertical direction of the second image.

According to this aspect, the panorama development is performed on the image captured using the fish-eye lens, and then the distortion correction and the resolution enhancement processing are performed. Generally, in an image captured using a fish-eye lens, in most cases, the subject of interest is reflected on the peripheral portion of the lens of which the resolution is generally lowered. In the present aspect, since the resolution enhancing processing is performed after correcting the distortion frequently occurring in the peripheral portion of the lens, it is possible to obtain an image with favorable image quality even in the peripheral portion of the lens of which the resolution is lowered.

Preferably, the resolution enhancement processing section performs the resolution enhancement processing on only a partial area of the second image.

According to the present aspect, since the resolution enhancement processing section is performed only on the partial area of the second image, for example, it is possible to perform the resolution enhancement processing on only the portion in which the subject of interest is captured. In such a manner, it is possible to efficiently perform the resolution enhancement processing.

Preferably, the resolution enhancement processing section changes a level of enhancement of the resolution enhancement processing in accordance with a position of the second image in a vertical direction.

According to the present aspect, in the resolution enhancement processing, the level of enhancement of the resolution enhancement processing can be changed in accordance with the position in the vertical direction of the second image. Therefore, for example, the level of enhancement is strong in a portion in which an image of the main subject is captured, and is weak in the other portion. In such a manner, it is possible to efficiently perform the resolution enhancement processing.

Preferably, the resolution enhancement processing section reduces the level of enhancement of the resolution enhancement processing in accordance with the position of the second image in the vertical direction.

According to the present aspect, in the resolution enhancement processing, the level of enhancement of the resolution enhancement processing can be reduced in accordance with the position in the vertical direction of the second image. Therefore, for example, the resolution enhancement processing is performed with a high level of enhancement on the lower side in the vertical direction of the second image, and the resolution enhancement processing is performed with a low level of enhancement on the upper side in the vertical direction of the second image. In such a manner, it is possible to efficiently perform the resolution enhancement processing.

Preferably, the image processing device further comprises a third image generation section that performs reverse panorama development, which is reverse processing of the panorama development performed by the second image generation section, on the second image so as to generate a third image.

According to the present aspect, since the reverse panorama development is performed on the second image on which the resolution enhancement processing is performed, it is possible to obtain the third image which has the composition similar to that of the first image and which is subjected to the resolution enhancement processing.

An image processing method according to another aspect of the present invention comprises: an image acquisition step of acquiring a first image which is acquired from an imaging element by imaging a subject image using an optical system; a second image generation step of generating a second image which is developed as a panorama by performing polar coordinate transformation on the first image acquired by the image acquisition step; and a resolution enhancement processing step of performing resolution enhancement processing on the second image asymmetrically in a horizontal direction and a vertical direction of the second image.

A program according to another aspect of the present invention causes a computer to execute: an image acquisition step of acquiring a first image which is acquired from an imaging element by imaging a subject image using an optical system a second image generation step of generating a second image which is developed as a panorama by performing polar coordinate transformation on the first image acquired by the image acquisition step; and a resolution enhancement processing step of performing resolution enhancement processing on the second image asymmetrically in a horizontal direction and a vertical direction of the second image.

According to the present invention, the resolution enhancement processing is performed, asymmetrically in the horizontal direction and the vertical direction of the second image, on the second image which is acquired by performing panorama development on the first captured image and in which the sagittal direction and the tangential direction of the optical system and the horizontal direction and the vertical direction of the image are aligned. Therefore, it is possible to suppress the calculation load of the resolution enhancement processing asymmetrically in the horizontal direction and the vertical direction of the second image.

BRIEF DESCRIPTION OF THE DRAWINGS

FIG. 5 is a diagram schematically illustrating a panoramic developed image.

FIGS. 8A and 8B are diagrams illustrating examples of a recovery filter.

DESCRIPTION OF THE PREFERRED EMBODIMENTS

Referring to accompanying drawings, embodiments of the present invention will be described. In the following embodiments, a description will be given of an example, in which the present invention is applied to a digital camera (imaging device) connectable to a computer (PC: personal computer).

Figure 1:
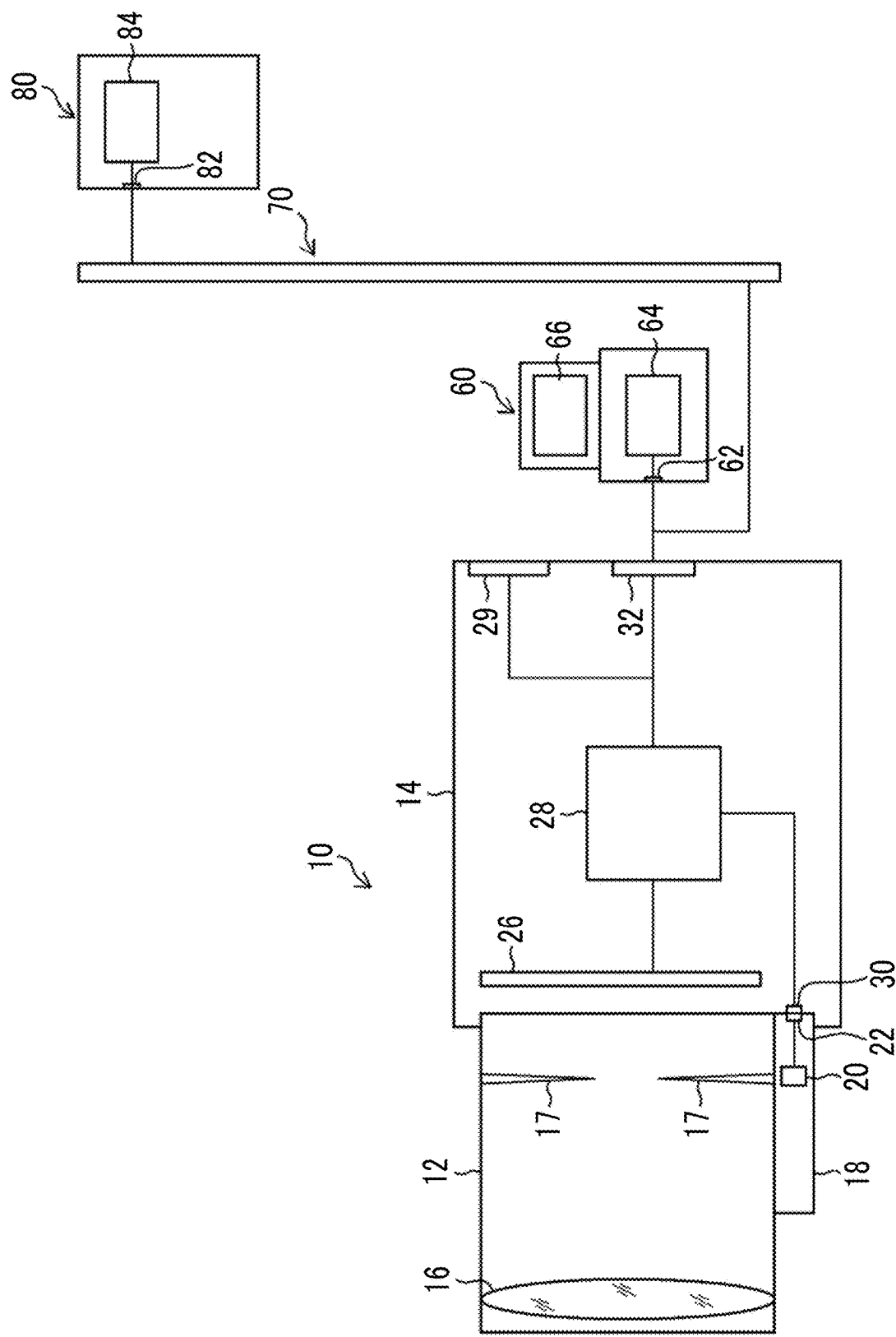
FIG. 1 is a block diagram illustrating a digital camera connected to a computer.

FIG. 1 is a block diagram illustrating a digital camera connected to a computer.

The digital camera 10 comprises a lens unit 12, and the camera body 14 having an imaging element 26. The digital camera 10 is electrically connected to the lens unit 12 and the camera body 14 through a lens unit input/output section 22 of the lens unit 12 and a camera body input/output section 30 of the camera body 14. The digital camera 10 is a camera used for various applications. For example, the digital camera 10 is used not only for general imaging applications but also for security applications (surveillance cameras) or medical applications (endoscopes).

The lens unit 12 includes optical systems such as a lens 16 and a stop 17 and an optical system operation section 18 that controls the optical systems. The optical system operation section 18 includes: a lens unit controller 20 that is connected to the lens unit input/output section 22; and an actuator (not shown in the drawing) that operates the optical systems. The lens unit controller 20 controls the optical systems through the actuator on the basis of a control signal which is sent from the camera body 14 through the lens unit input/output section 22, and performs, for example, focus control and zoom control based on lens movement and aperture amount control of the stop 17.

The imaging element 26 of the camera body 14 has condenser micro lenses, color filters of R (red), G (green). B (blue), and the like, and image sensors (photodiodes: complementary metal oxide semiconductors (CMOS), charge-coupled devices (CCD), or the like). The imaging element 26 converts light of a subject image emitted through the optical systems (such as the lens 16 and the stop 17) of the lens unit 12 into an electric signal, and sends the image signal (original image data) to the camera body controller 28. It should be noted that the imaging element 26 is able to output an image signal of a color image and a monochrome image signal.

The imaging element 26 of the present example outputs the original image data obtained through subject image capturing using the optical system, and transmits the original image data to an image processing device 35 of the camera body controller 28.

Figure 2:
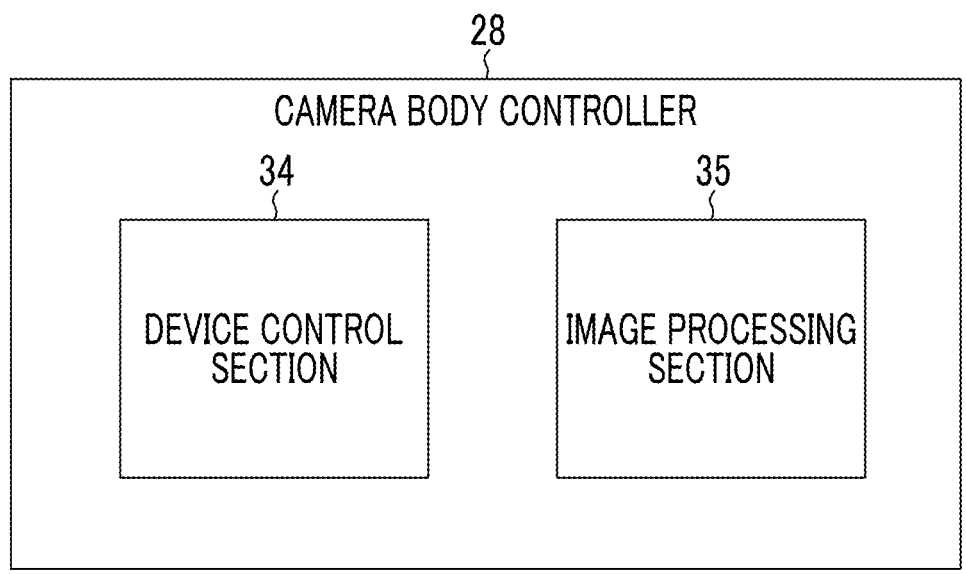
FIG. 2 is a block diagram illustrating a functional configuration example of a camera body controller.

As shown in FIG. 2, the camera body controller 28 has the device control section 34 and an image processing section (image processing device) 35, and integrally controls the camera body 14. The device control section 34 controls, for example, the output of the image signal (image data) sent from the imaging element 26, generates the control signal for controlling the lens unit 12, transmits the signal to the lens unit 12 (lens unit controller 20) through the camera body input/output section 30, and transmits image data (RAW data, JPEG data, and the like) before and after the image processing to external devices (the computer 60 and the like) connected through an input/output interface 32. Further, the device control section 34 appropriately controls various kinds of devices, such as a display section (EVF: electronic view finder, rear-side liquid crystal display section) not shown in the drawing, provided in the digital camera 10.

In contrast, the image processing section 35 performs arbitrary image processing on the image signal which is sent from the imaging element 26, as necessary. For example, the image processing section 35 appropriately performs various kinds of image processing such as sensor correction processing, demosaic (synchronization) processing, pixel interpolation processing, color correction processing (offset correction processing, white balance processing, color matrix processing, gradation correction processing, and the like), RGB image processing (tone correction processing, exposure correction processing, and the like), RGB/YCrCb conversion processing, and image compression processing.

The digital camera 10 shown in FIG. 1 is provided with other members (shutter and the like) necessary for imaging and the like. With such a configuration, a user is able to appropriately determine and change various kinds of setting (exposure value (EV)) for the imaging and the like through the user interface 29 which is provided on the camera body 14. The user interface 29 is connected to the camera body controller 28 (the device control section 34 and the image processing section 35), whereby various kinds of setting determined and changed by a user is reflected in various kinds of processing in the camera body controller 28.

The image data, which is subjected to the image processing in the camera body controller 28, is sent to the computer 60 and the like through the input/output interface 32. A format of the image data, which is sent from the digital camera 10 (camera body controller 28) to the computer 60, is not particularly limited, and may be an arbitrary format such as RAW, JPEG or TIFF. Consequently, the camera body controller 28 may associate a plurality of related data pieces with each other so as to form a single image file, and may transmit the image file to the computer 60. The related data pieces include, like so-called exchangeable image file format (Exif), header information (imaging information (imaging date and time, a device type, a pixel number, an aperture value, and the like) and the like), main image data, and thumbnail image data, and the like.

The computer 60 is connected to the digital camera 10 through the input/output interface 32 and the computer input/output section 62 of the camera body 14, and receives data pieces such as image data which is sent from the camera body 14. The computer controller 64 integrally controls the computer 60 such that it performs image processing on the image data sent from the digital camera 10, and performs communication control to communicate with a server 80 which is connected to the computer input/output section 62 through network lines such as the Internet 70. The computer 60 has a display 66, and the display 66 displays processing contents in the computer controller 64 on the display 66 as necessary. A user is able to input data or a command to the computer controller 64 by operating input means (not shown in the drawing) such as a keyboard or the like while checking a display of the display 66. Thereby, the user is able to control the computer 60 and control devices (the digital camera 10, or the server 80) connected to the computer 60.

The server 80 has a server input/output section 82 and a server controller 84. The server input/output section 82 constitutes a connection section for transmission to and reception from external devices such as the computer 60, and is connected to the computer input/output section 62 of the computer 60 through network lines such as the Internet 70. The server controller 84 transmits and receives some sort of data to and from the computer controller 64 as necessary, downloads some sort of data to the computer 60, performs calculation processing, and transmits the calculation results to the computer 60, in cooperation with the computer controller 64 in response to a control instruction signal which is sent from the computer 60.

Each controller (the lens unit controller 20, the camera body controller 28, the computer controller 64, and the server controller 84) has circuits necessary for control processing. For example, the controllers include a calculation processing circuit (CPU or the like), a memory, and the like. Further, communication between the digital camera 10, the computer 60, and the server 80 may be performed through wired or wireless connection. Furthermore, the computer 60 and the server 80 may be integrally formed, and the computer 60 and/or the server 80 may be omitted. In addition, by making the digital camera 10 have a function of communicating with the server 80, various kinds of data may be directly transmitted and received between the digital camera 10 and the server 80.

First Embodiment

Figure 3:
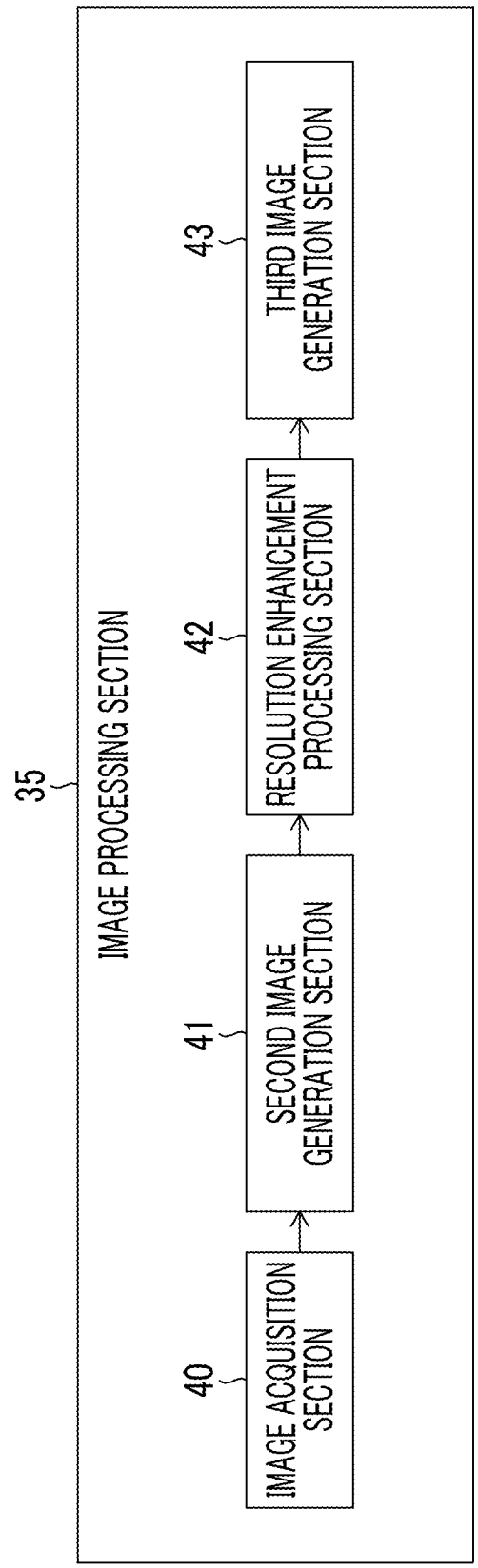
FIG. 3 is a functional block diagram illustrating a functional configuration example of an image processing section.

FIG. 3 is a functional block diagram illustrating a functional configuration example of the image processing section 35.

In addition to the above-mentioned functions, the image processing section 35 provided in the camera body controller 28 mentioned above comprises an image acquisition section 40, a second image generation section 41, a resolution enhancement processing section 42, and a third image generation section 43.

The image acquisition section 40 acquires a captured image (first image) acquired from the imaging element 26 by imaging the subject image using the optical system. Here, the captured image is based on the image data output from the imaging element 26 in a case where the subject image is captured, and it not particularly limited so long as the panorama development performed by the second image generation section 41 described later can be performed. For example, the image acquisition section 40 acquires image data, for which sensor correction processing, demosaic processing, pixel interpolation processing, color correction processing, RGB image processing, and RGB/YCrCb conversion processing have been completed, as captured images. In the following description, the resolution restoration processing is performed on Y (luminance value) of the image subjected to the YCrCb conversion processing. In addition, the image acquisition section 40 can acquire a color image or a monochrome (black and white) image, and the present invention has an effect on a color image and a monochrome (black and white) image.

Figure 4:
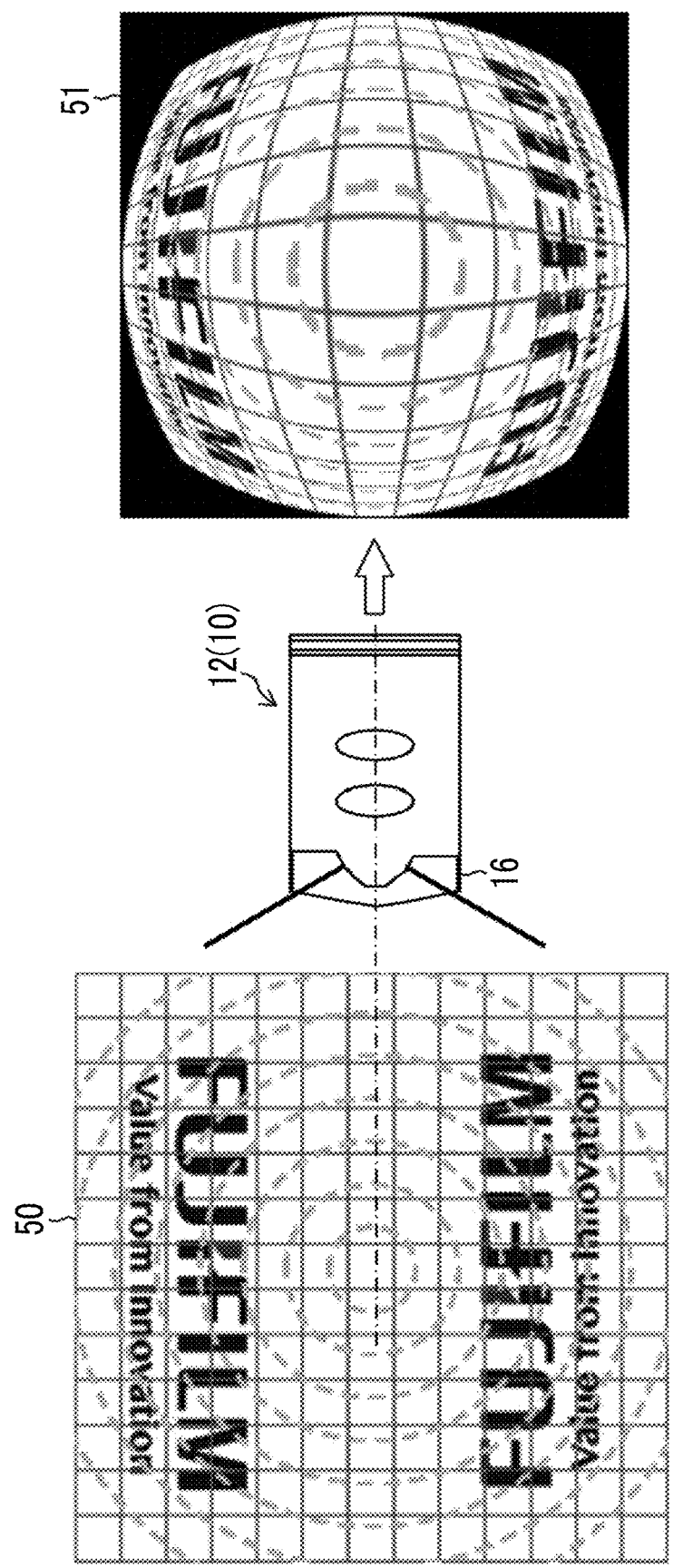
FIG. 4 is a diagram schematically illustrating a captured image acquired by the image acquisition section by capturing a subject image (subject) with a digital camera.

FIG. 4 schematically shows the captured image 51 which is acquired by the image acquisition section 40 by capturing the subject image (subject) 50 through the digital camera 10. In the digital camera 10, the lens unit 12 and the lens 16 are shown, and other portions are omitted. In addition, a case where a fish-eye lens is used as the lens 16 is shown. Since the subject image 50 is captured through the lens 16 (fish-eye lens), distortion is caused in the captured image 51 by the characteristics (distortion) of the lens 16. In the captured image 51, the resolution differs between the sagittal direction and the tangential direction of the lens 16. The image acquisition section 40 transmits the acquired captured image 51 to the second image generation section 41. Here, the resolution is an index indicating the level of image blurring, and various kinds of indexes are used. For example, a modulation transfer function (MTF) of the lens 16 may be used to represent the level of image blurring. It should be noted that "FUJIFILM Value from Innovation" in FIG. 4 is a registered trademark.

The second image generation section 41 generates a panoramic developed image 52 (second image) which is developed as a panorama by performing polar coordinate transformation on the captured image 51 acquired by the image acquisition section 40.

FIG. 5 schematically shows the panoramic developed image 52 generated from the captured image 51. Here, the panorama development is to generate the panoramic developed image 52 by developing the captured image 51 through polar coordinate transformation. Specifically, as shown in FIG. 5, the panoramic developed image 52 is an image which is obtained by performing coordinate transformation such that a concentric circle (indicated by a dotted line in the captured image 51) based on the center of the captured image 51 is changed to a substantially straight line. It should be noted that the substantially straight line is used here since distortion may be asymmetrically generated by manufacturing errors or the like and panorama development through which a perfect straight line is obtained may not be performed. The subject information in the captured image 51 is also carried in the panoramic developed image 52 such that the vertical direction (the y direction in the drawing) of the panoramic developed image 52 corresponds to the tangential direction of the lens 16, and the horizontal direction (the x direction in the drawing) of the panoramic developed image 52 corresponds to the sagittal direction of the lens 16. In the captured image 51 and the panoramic developed image 52 in FIG. 5, the tangential direction of the lens 16 is indicated by an arrow T, and the sagittal direction of the lens 16 is indicated by an arrow S.

The resolution enhancement processing section 42 performs resolution enhancement processing on the panoramic developed image 52 (second image) asymmetrically in the horizontal direction and the vertical direction of the panoramic developed image 52. Specifically, the resolution enhancement processing section 42 performs different resolution enhancement processing in the x direction and the y direction of the panoramic developed image 52 shown in FIG. 5. For example, the resolution enhancement processing section 42 is able to perform the resolution enhancement processing with a high level of enhancement in the y direction, and perform the resolution enhancement processing with a low level of enhancement in the x direction. Thereby, it is possible to efficiently suppress lowering in the resolution of the panoramic developed image 52 in the y direction.

The resolution enhancement processing section 42 performs resolution enhancement processing on an image in which the tangential direction and the sagittal direction of the lens 16 and the vertical direction and the horizontal direction of panoramic developed image 52 are aligned. Therefore, it is possible to reduce a calculation load of the resolution enhancement processing. That is, in a case where the resolution enhancement processing section 42 performs resolution enhancement processing on the image (captured image 51) in which a relationship between positions in the sagittal direction and the tangential direction of the lens 16 and the horizontal direction and the vertical direction of the captured image is changed in accordance with the position of the captured image 51, it becomes necessary to change the form of the resolution enhancement filter in accordance with the position of the captured image 51. Hence, in a case of performing resolution enhancement processing on the panoramic developed image 52, it is possible to minimize the calculation load. Further, such reduction in calculation load is particularly effective for image processing of a moving image.

FIG. 5 shows an example of the panoramic developed image 52 in which the vertical direction (the y direction in FIG. 5) of the panoramic developed image 52 corresponds to the tangential direction of the lens 16 and the horizontal direction of the panoramic developed image 52 (the x direction in FIG. 5) corresponds to the sagittal direction of the lens 16. For example, in the panoramic developed image 52, the vertical direction (the y direction in FIG. 5) of the panoramic developed image 52 may be set to correspond to the sagittal direction of the lens 16, and the horizontal direction (the x direction in FIG. 5) of the panoramic developed image 52 may be set to correspond to the tangential direction of the lens 16.

Next, the resolution enhancement processing performed by the resolution enhancement processing section 42 will be described. The resolution enhancement processing performed by the resolution enhancement processing section 42 is not particularly limited as long as the processing is processing of enhancing (suppressing blurring) the resolution of the panoramic developed image 52. For example, the resolution enhancement processing section 42 performs recovery processing on the luminance value of the panoramic developed image 52 by using a recovery filter designed on the basis of the point spread function of the optical system. Further, for example, the resolution enhancement processing section 42 performs outline enhancement processing on the luminance value of the panoramic developed image 52 by using an outline enhancement filter. The resolution enhancement processing section 42 is also able to perform resolution enhancement processing on the RGB image before the demosaic processing. In this case, the resolution enhancement processing is performed on the RGB image which is developed as a panorama.

The recovery processing performed by the resolution enhancement processing section 42 will be described.

Figure 6:
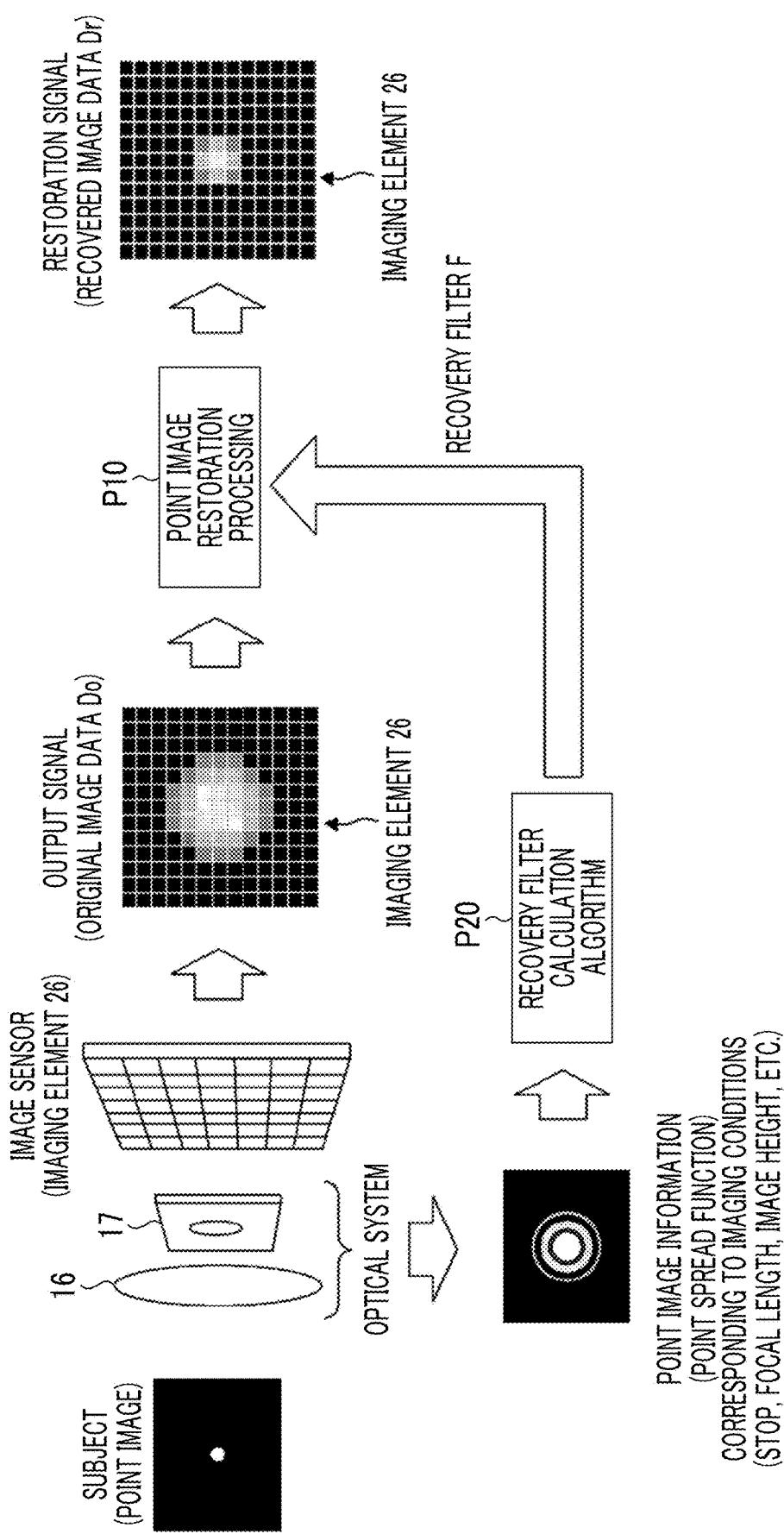
FIG. 6 is a diagram illustrating a brief overview from image capturing to point image restoration processing.

FIG. 6 is a diagram illustrating a brief overview from image capturing to point image restoration processing (recovery processing). In a case where the point image is captured as a subject, the imaging element 26 (image sensor) receives the subject image through the optical system (the lens 16, the stop 17, and the like), and the imaging element 26 outputs the original image data Do. The original image data Do is image data of an original subject image which is blurred due to the point spread phenomenon caused by characteristics of the optical system.

The original subject image (point image) is restored from the original image data Do of the blurred image. Accordingly, by performing point image restoration processing P10 on the original image data Do through a recovery filter F, it is possible to obtain recovered image data Dr which indicates an image (recovered image) closer to the original subject image (point image).

The recovery filter F used in the point image restoration processing P10 can be obtained using a predetermined recovery filter calculation algorithm P20 from point image information (point spread function) of the optical system corresponding to the imaging conditions at the time of acquiring the original image data Do. The point image information (point spread function) of the optical system is changed depending on not only a type of the lens 16 but also various imaging conditions such as an aperture value, a focal length, a zoom ratio, an image height, the number of recorded pixels, and a pixel pitch. Accordingly, in order to calculate the recovery filter F, such imaging conditions are acquired.

Figure 7:
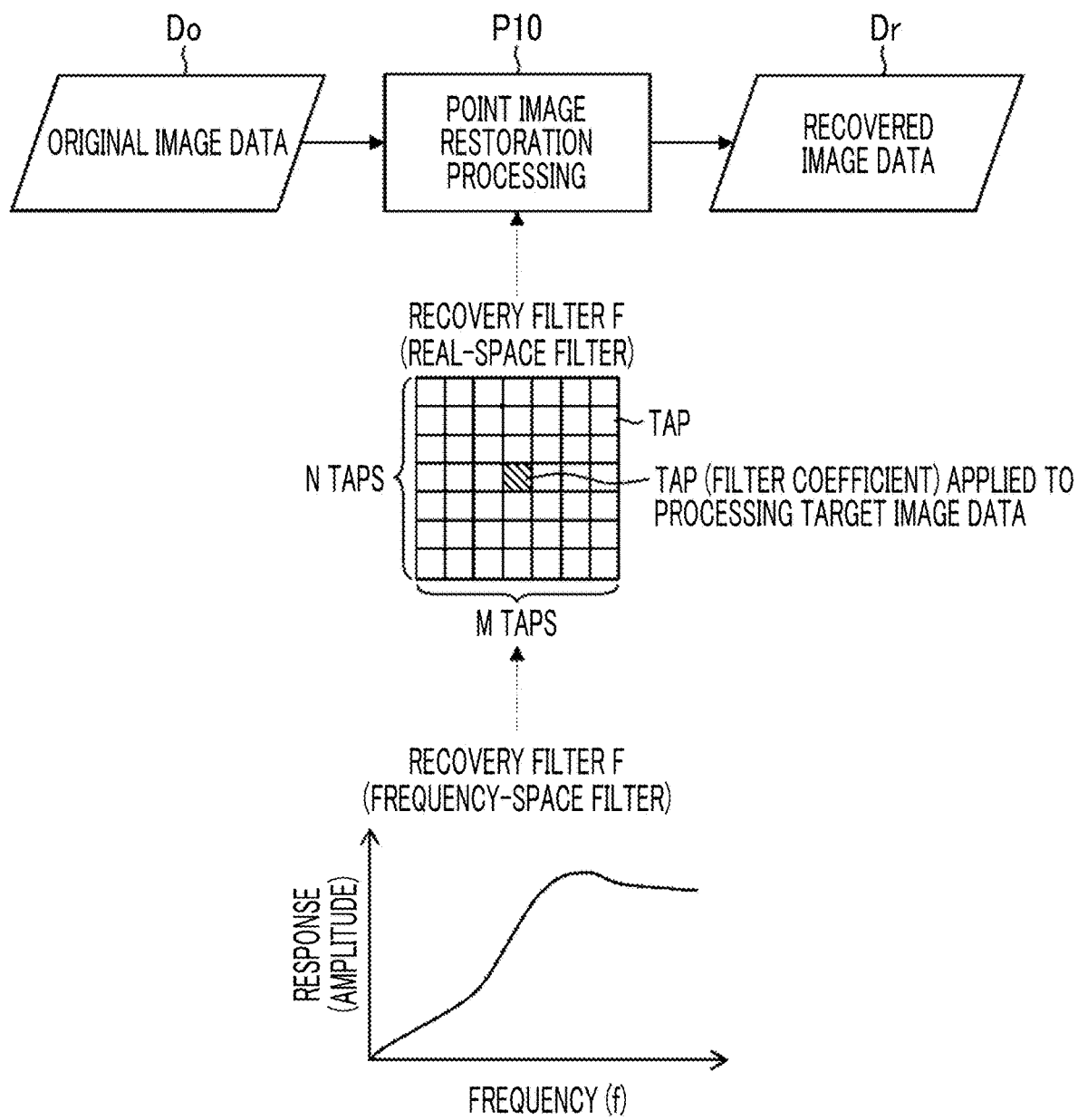
FIG. 7 is a block diagram illustrating an example of the point image restoration processing.

FIG. 7 is a block diagram illustrating an example of the point image restoration processing.

As described above, the point image restoration processing P10 is processing of creating the recovered image data Dr from the original image data Do through filtering processing using the recovery filter F. For example, the real-space recovery filter F, which is formed of taps of N×M (N and M are integers equal to or greater than 2), is applied to the image (image data) as a processing target. Thereby, by performing weighted average calculation (deconvolution calculation) on the pixel data (processing target pixel data of the original image data Do and adjacent-pixel data) corresponding to a filter coefficient which is allocated in each tap, it is possible to calculate the pixel data (recovered image data Dr) subjected to the point image restoration processing. By sequentially applying the weighted average processing using the recovery filter F to data pieces of all pixels composing the image (image data) instead of the target pixels, it is possible to perform the point image restoration processing.

The real-space recovery filter formed of the N×M taps can be derived by performing inverse Fourier transform on a frequency-space recovery filter. Consequently, the real-space recovery filter can be appropriately calculated by specifying the frequency-space recovery filter as a reference and designating the number of taps composing the real-space recovery filter.

FIGS. 8A and 8B are diagrams illustrating examples of a recovery filter. FIG. 8A shows a known recovery filter E. and FIG. 8B shows a recovery filter F, which is used in the present invention, for performing processing asymmetrically in the vertical direction and the horizontal direction.

FIG. 8A is a diagram illustrating an example of the recovery filter E having a kernel size of 7×7. The recovery filter E is designed to be rotationally symmetric with respect to the kernel center. The rotationally symmetrical recovery filter E is able to reduce data to be stored in the memory. For example, in the case of the kernel of 7×7 shown in FIG. 4, the recovery filter E of 4×4 is stored, and thereby the recovery filter E of 7×7 is made using the symmetry.

FIG. 8B is a diagram illustrating an example of a recovery filter F having a kernel size of 5×5. The recovery filter F is a recovery filter that performs recovery processing asymmetrically in the horizontal direction and the vertical direction of the panoramic developed image 52.

The recovery filter F of the present aspect is a recovery filter corresponding to the panoramic developed image 52.

That is, the following is reflected in filter design for the panoramic developed image 52: the vertical direction and the horizontal direction of the panoramic developed image 52 and the sagittal direction and the tangential direction of the lens 16 are aligned.

In the panoramic developed image 52 subjected to the resolution enhancement processing, the vertical direction of the panoramic developed image 52 and the tangential direction of the lens 16 and the horizontal direction of the panoramic developed image 52 and the sagittal direction of the lens 16 are aligned. Therefore, by using a filter which is designed like the recovery filter F, it is possible to achieve effective recovery processing of which a calculation load is minimized in the tangential direction and the sagittal direction of the lens 16.

Next, the outline enhancement processing performed by the resolution enhancement processing section 42 will be described.

Also in the outline enhancement performed by the resolution enhancement processing section 42, by performing weighted average calculation (deconvolution calculation) on the pixel data and a filter coefficient allocated in each tap of the outline enhancement filter G in a manner similar to that of the above-mentioned recovery processing, it is possible to calculate the pixel data subjected to the outline enhancement processing.

The weighted average processing using this outline enhancement filter is applied to all the pixel data composing the image data while sequentially changing the target pixels. Thereby, it is possible to perform outline enhancement processing.

Here, the outline enhancement processing is a concept including processing called edge enhancement processing or sharpness enhancement processing. It should be noted that the outline enhancement filter is created by a known method.

Returning to FIG. 3, the third image generation section 43 performs reverse panorama development on the panoramic developed image 52 so as to generate a reversed panoramic developed image (third image). That is, the third image generation section 43 performs reverse processing (reverse panorama development) of the panorama development, which is performed by the second image generation section 41, on the panoramic developed image 52 so as to generate a reversed panoramic developed image. The reversed panoramic developed image is an image that has the same composition as the captured image 51 and is subjected to resolution enhancement processing. It should be noted that the third image generation section 43 can be arbitrarily installed. For example, the third image generation section 43 may not be provided for applications in which the panoramic developed image 52 may be output.

Figure 9:
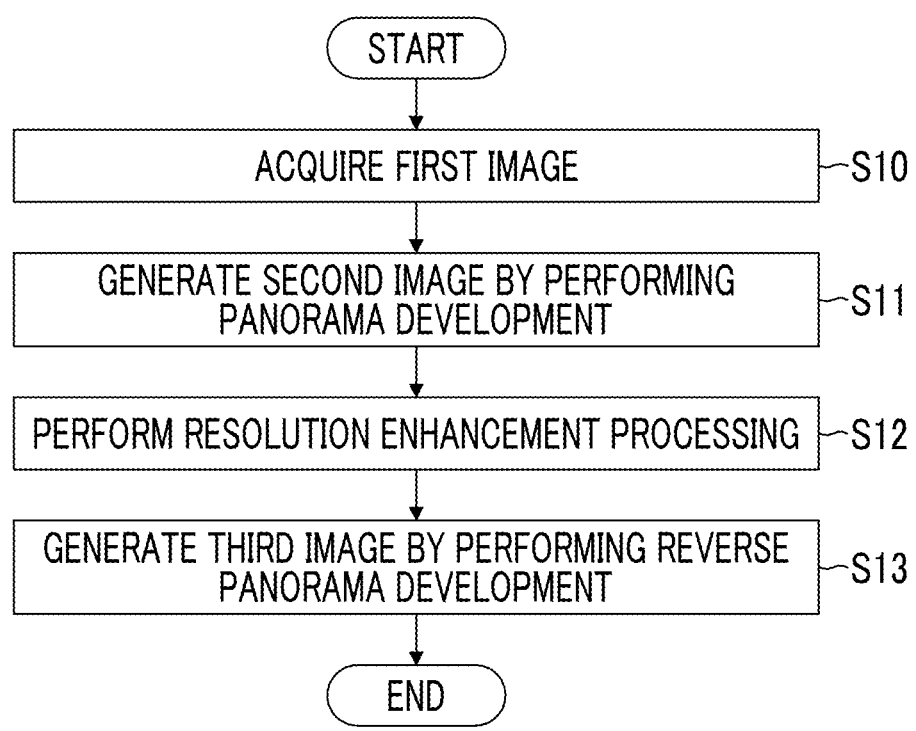
FIG. 9 is a flowchart illustrating the operation of the image processing section.

FIG. 9 is a flowchart illustrating an operation of the image processing section 35.

First, the image acquisition section 40 of the image processing section 35 acquires a captured image 51 (first image) acquired from the imaging element 26 by imaging the subject image 50 using the optical system (image acquisition step: step S10). Next, the second image generation section 41 performs panorama development by performing polar coordinate transformation on the acquired first image, and thereby generates a panoramic developed image 52 (second image) (second image generation step: step S11). Thereafter, the resolution enhancement processing section 42 performs resolution enhancement processing on the panoramic developed image 52 (resolution enhancement step: step S12). Next, the third image generation section 43 performs reverse panorama development on the panoramic developed image 52 subjected to the resolution enhancement processing, and thereby generates a reversed panoramic developed image (third image) (step S13).

The above-mentioned configurations and functions are appropriately implemented by arbitrary hardware, software, or a combination of both thereof. For example, the present invention can also be applied to a program that causes the computer 60 to execute the above-mentioned processing step (processing order), a recording medium (non-transitory recording medium) that can be read by the computer 60 in which such a program is recorded, or the computer 60 in which such a program can be installed.

As described above, in the present embodiment, the resolution enhancement processing is performed, asymmetrically in the horizontal direction and in the vertical direction of the panoramic developed image 52, on the panoramic developed image 52 which is obtained by performing panorama development on the captured image 51 and in which the sagittal direction and the tangential direction of the optical system and the horizontal direction and the vertical direction of the image are aligned. Therefore, it is possible to suppress the load of the calculation processing of the resolution enhancing processing which is performed asymmetrically in the horizontal direction and the vertical direction of the panoramic developed image 52.

Second Embodiment

Next, a second embodiment of the present invention will be described. In the present embodiment, resolution enhancement processing is performed on the panoramic developed image 52 on which the distortion correction has been performed.

Figure 10:
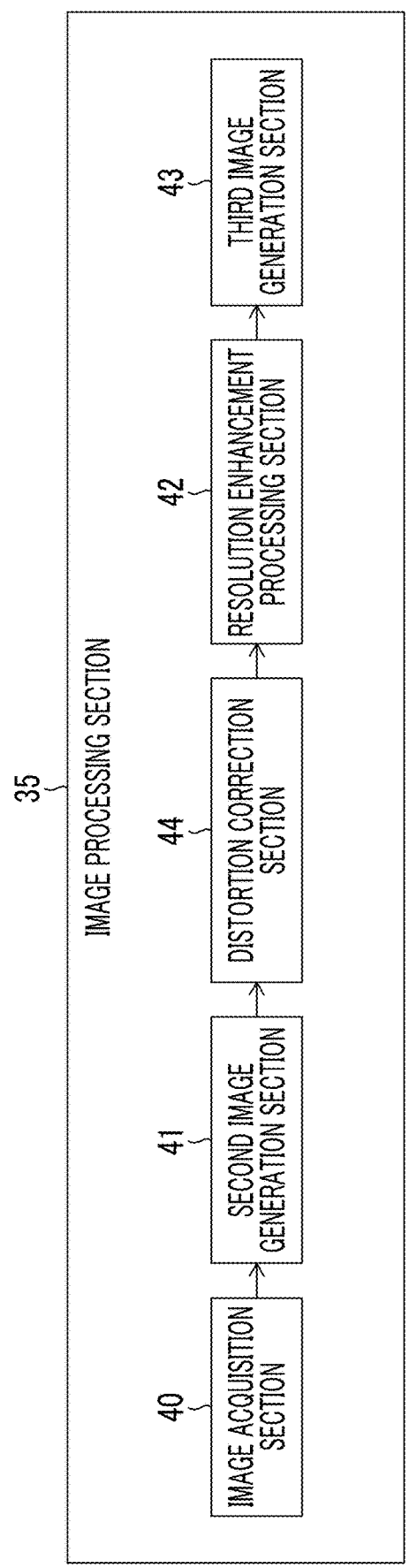
FIG. 10 is a block diagram illustrating a functional configuration example of the image processing section.

FIG. 10 is a block diagram illustrating a functional configuration example of the image processing section 35 in the present embodiment. The image processing section 35 of the present embodiment is composed of the image acquisition section 40, the second image generation section 41, the distortion correction section 44, the resolution enhancement processing section 42, and the third image generation section 43. The same reference numerals and signs are given to the parts already described in FIG. 3, and the description is omitted.

Compared with the image processing section 35 shown in FIG. 3, the image processing section 35 of the present embodiment is provided with a distortion correction section 44 between the second image generation section 41 and the resolution enhancement processing section 42.

Figure 11:
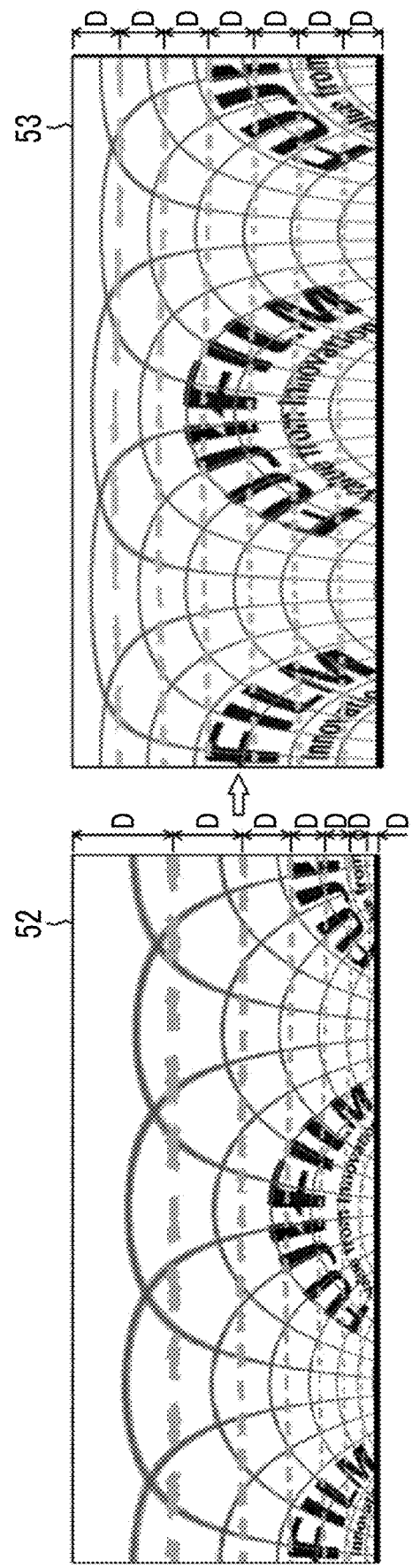
FIG. 11 is a diagram schematically illustrating a panoramic developed image and a panoramic developed image subjected to distortion correction.

The distortion correction section 44 performs distortion correction on the panoramic developed image 52 generated by the second image generation section 41. FIG. 11 schematically shows a panoramic developed image 52 and a panoramic developed image 53 subjected to distortion correction.

Here, distortion correction is coordinate transformation processing of correcting distortion caused by distortion. Specifically, as shown in FIG. 11, the distance D of the dotted lines in the panoramic developed image 52 is not uniform, but correction is performed such that the distance D of the dotted lines becomes uniform through the distortion correction. The term "distortion" means that the linear portion of the subject is imaged to be bent in the captured image 51. In a case of using a fish-eye lens, a wide-angle lens, or the like, the distortion may occur to a large extent.

In a case where the main subject image is captured in the peripheral portion of the lens like an image captured through a fish-eye lens or a wide-angle lens, by performing distortion correction in such a manner, the main subject, which is distorted in the panoramic developed image 52, can be straightened.

The resolution enhancement processing section 42 performs resolution enhancement processing on the panoramic developed image 53, which is subjected to the distortion correction, asymmetrically in the horizontal direction and the vertical direction of the panoramic developed image 53 subjected to the distortion correction. The resolution enhancement processing performed by the resolution enhancement processing section 42 is the same as the above-mentioned processing.

The resolution enhancement processing section 42 performs resolution enhancement processing on the panoramic developed image 52 subjected to the distortion correction, whereby the image of the peripheral portion of the lens in which the important subject is often captured is straightened. Since the resolution enhancement processing is performed in this state, it is possible to acquire an image with better image quality.

Modification Example

Next, a modified example of the resolution enhancement processing section 42 will be described. The resolution enhancement processing section 42 of the present example changes the level of enhancement of the resolution enhancement processing in accordance with the position in the vertical direction of the second image, or performs resolution enhancement processing on only a partial area of the second image.

Figure 12:
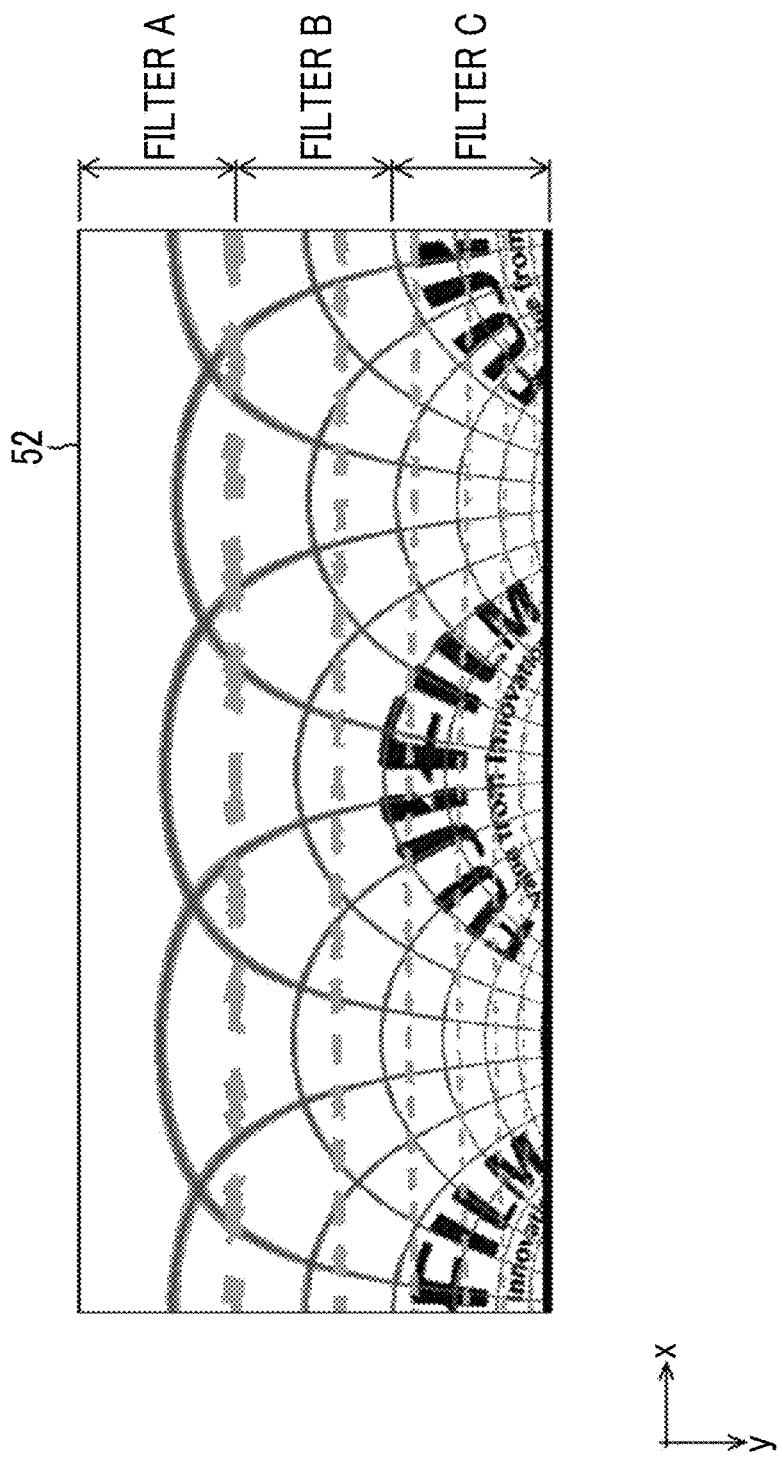
FIG. 12 is a diagram schematically illustrating a panoramic developed image.

FIG. 12 is a diagram schematically illustrating the panoramic developed image 52. The resolution enhancement processing section 42 of the present example adjusts the level of enhancement of the resolution enhancement processing by changing the gain of the resolution enhancement processing using different filters in accordance with an area in the vertical direction of the panoramic developed image 52, for example.

For example, as shown in FIG. 12, the resolution enhancement processing section 42 performs resolution enhancement processing through the filter A, the filter B, and the filter C in accordance with the position in the vertical direction of the panoramic developed image 52. The magnitudes of the gains of the filters A, B, and C are filter C>filter B>filter A. Here, the vertical direction of the panoramic developed image 52 is a direction parallel to the y axis in FIG. 12. By performing the resolution enhancement processing using the filter A, the filter B. and the filter C from the upper side in the vertical direction of the panoramic developed image 52 in this manner, the level of enhancement of the resolution enhancement processing can be reduced in accordance with the position in the vertical direction of the panoramic developed image 52.

Next, the gain of the resolution enhancement processing will be described. In a case where the same gain is applied for each frequency, the following expression (Expression 1) is established.

$$\text{Output Value} = a \times \text{Input Value} \qquad \text{(Expression 1)}$$

a: Gain

Even in a case where a different gain is applied for each frequency like the recovery processing and the outline enhancement processing performed by the resolution enhancement processing section 42 and the like, the expression (Expression 1) can be considered. In a case where a gain is changed for each frequency, the following expression (Expression 2) is established.

$$\text{Output Image} = \text{Input Image} * \text{Filter} \qquad \text{(Expression 2)}$$

It should be noted that * indicates convolution processing.

Then, a result obtained by performing Fourier transform on the filter can be called a gain.

Figure 13:
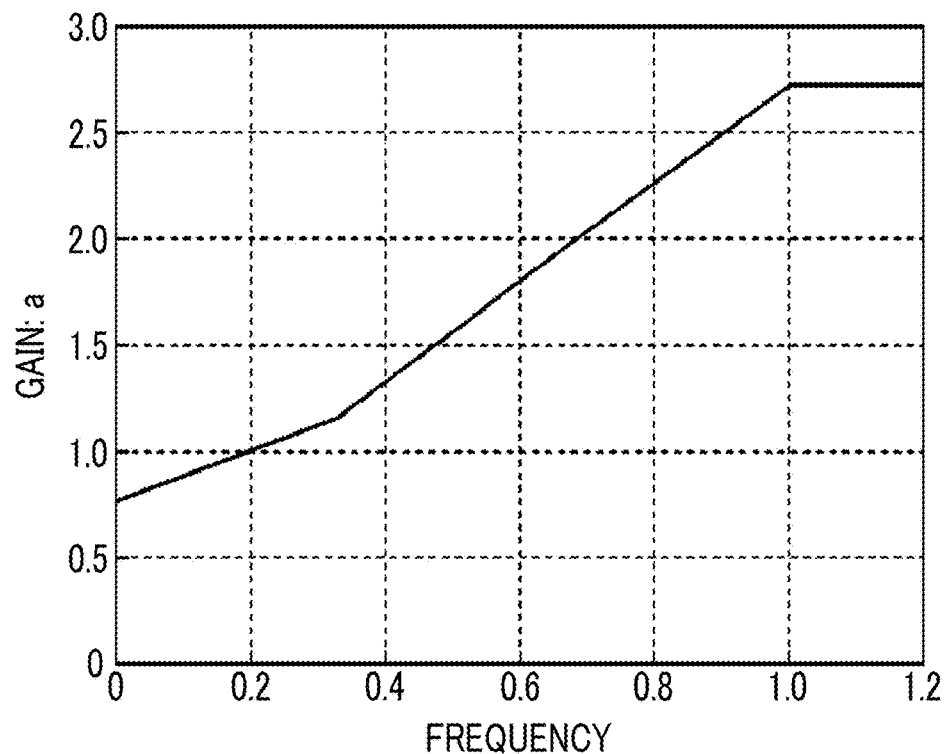
FIG. 13 is a diagram illustrating an example of a gain.

FIG. 13 is a diagram illustrating the gain of the filter. In the section (A) of FIG. 13, the recovery filter E shown in FIG. 8A is shown. In the section (B) of FIG. 13, the result of Fourier transform of the recovery filter E is shown. In such a manner, it is possible to obtain a gain on the frequency space by performing Fourier transform on the filter on the real space.

Further, in addition to the method of changing the gain of the resolution enhancement processing by changing the filter as described above, by using the following method, gain control may be performed.

First, the resolution enhancement processing section 42 performs recovery processing on the panoramic developed image 52 (input image) (referred to as a panoramic developed image ImgA) through the recovery filter F, thereby generating the panoramic developed image (panoramic developed image ImgB) subjected to the recovery processing. Thereafter, the resolution enhancement processing section 42 multiplies the panoramic developed image ImgB by the magnification (I-U), thereby generating a panoramic developed image ImgC. Then, the resolution enhancement processing section 42 adds the panoramic developed image ImgA and the panoramic developed image ImgC, thereby obtaining a panoramic developed image ImgD. This panoramic developed image ImgD is the panoramic developed image 52 subjected to the resolution enhancement processing with the gain magnification U.

Figure 14:
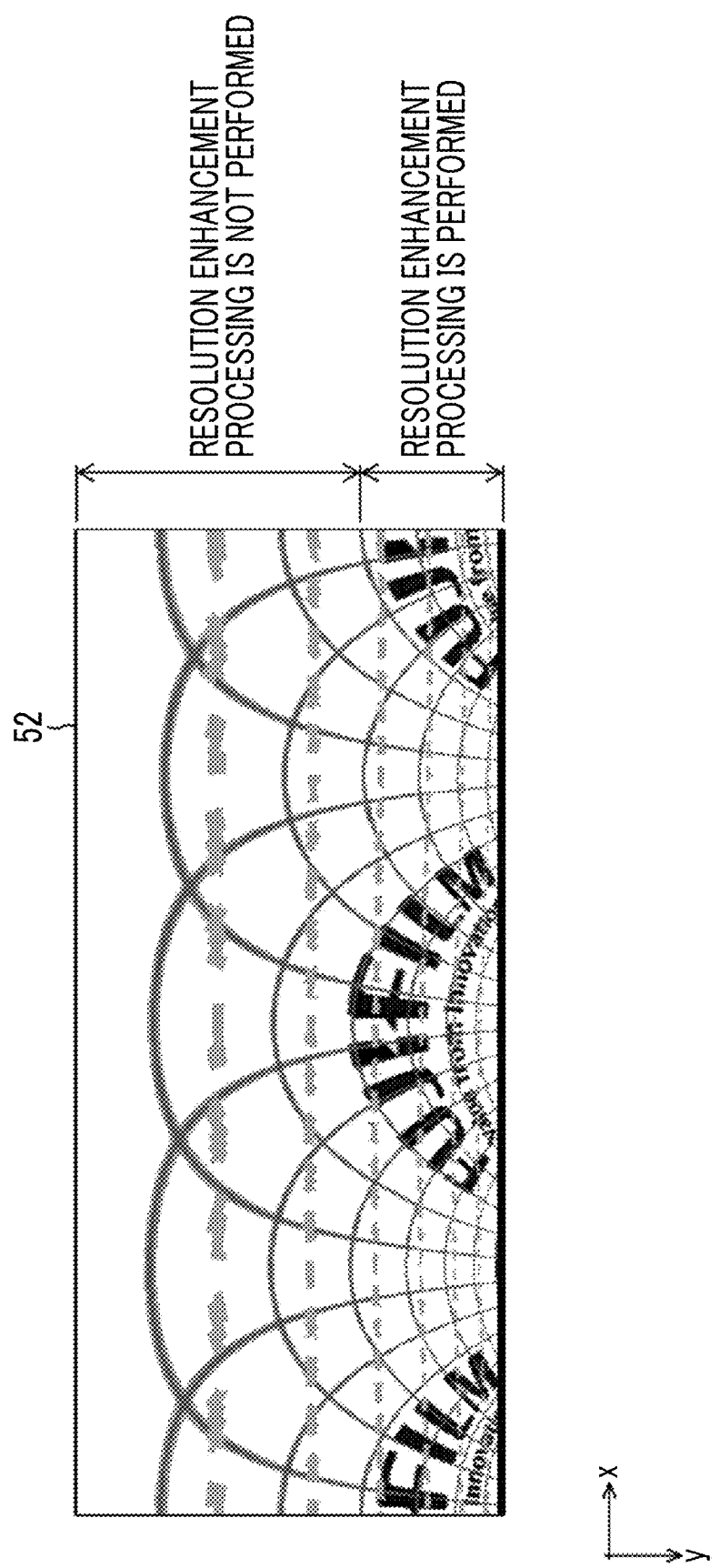
FIG. 14 is a diagram schematically illustrating a panoramic developed image.

FIG. 14 is a diagram schematically illustrating the panoramic developed image 52. The resolution enhancement processing section 42 of the present example may perform the resolution enhancement processing only on a partial area of the second image. In a case where a main subject image (a subject image of interest) is captured in the peripheral portion of the lens like an image captured with a fish-eye lens or a wide-angle lens, the image of the main subject is present on the lower side (the lower side in the y direction of FIG. 14) in the vertical direction of the panoramic developed image 52. In such a case, the resolution enhancement processing section 42 performs resolution enhancement processing only on the main subject, and does not perform resolution processing on the other parts. Thereby, the resolution enhancement processing section 42 is able to perform the resolution processing efficiently. Incidentally, examples of an image in a case where the main subject image is captured in the peripheral portion of the lens include an image captured by the endoscope and an image captured by the surveillance camera.

<Example of Application to EDoF System>

In the above-mentioned embodiment, the restoration processing is image processing of restoring an original subject image by recovering and correcting point spread (point image blurring) in accordance with the specific imaging conditions (for example, the aperture value, the F number, the focal length, the lens type, and the like). However, image restoration processing, to which the present invention can be applied, is not limited to the restoration processing according to the above-mentioned embodiment. For example, the restoration processing according to the present invention can be applied to restoration processing, which is performed on image data acquired and captured through an optical system (an imaging lens or the like) having the extended depth of field (focus) (EDoF). By performing the restoration processing on the image data of a blurred image captured and acquired in a state where the depth of field (depth of focus) is extended by the EDoF optical system, it is possible to restore and generate high-resolution image data of an image which is in focus in a wide range. In this case, the restoration processing (recovery processing) is performed through the restoration filter (recovery filter) which is based on the point spread function of the EDoF optical system and which has a filter coefficient that is set to restore a desired image in a range of the extended depth of field (depth of focus).

Hereinafter, an example of the system (EDoF system) for restoration of the image data, which is captured and acquired through the EDoF optical system, will be described. In addition, in the following example, a description will be given of an example in which the restoration processing is performed on the luminance signal (Y data). The luminance signal is obtained from the image data (RGB data) which is obtained after the demosaic processing. However, the timing of performing the restoration processing is not particularly limited. For example, the restoration processing may be performed on "the image data (mosaic image data) obtained before the demosaic processing" or "the image data (demosaic image data) obtained before the luminance signal conversion processing after the demosaic processing".

Figure 15:
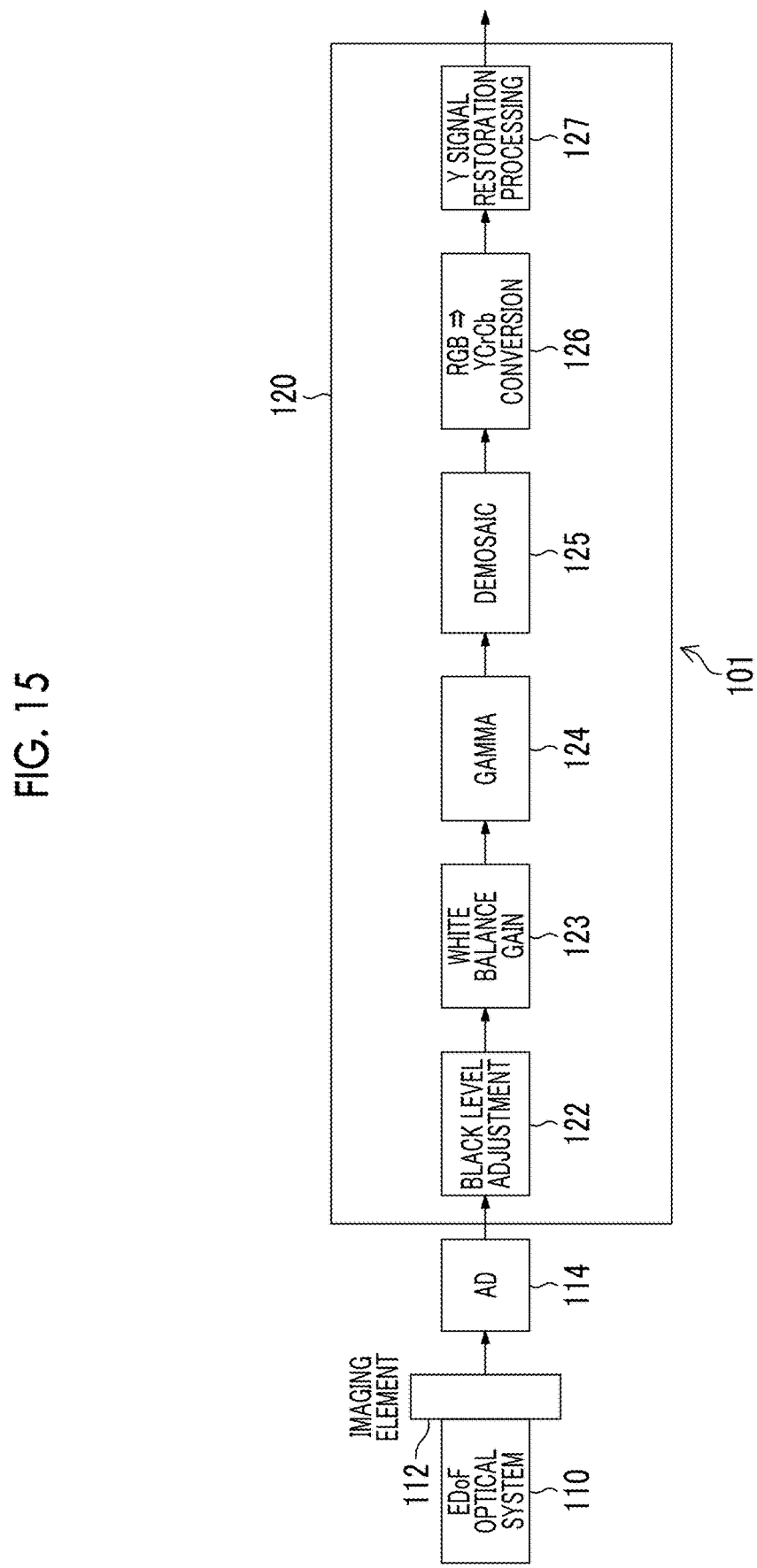
FIG. 15 is a block diagram illustrating one configuration of an imaging module comprising an EDoF optical system.

FIG. 15 is a block diagram illustrating one form of an imaging module 101 including the EDoF optical system. The imaging module (such as digital camera) 101 of the present example includes an EDoF optical system (lens unit) 110, an imaging element 112, an analog-digital (AD) conversion section 114, and a restoration processing block (image processing section) 120.

Figure 16:
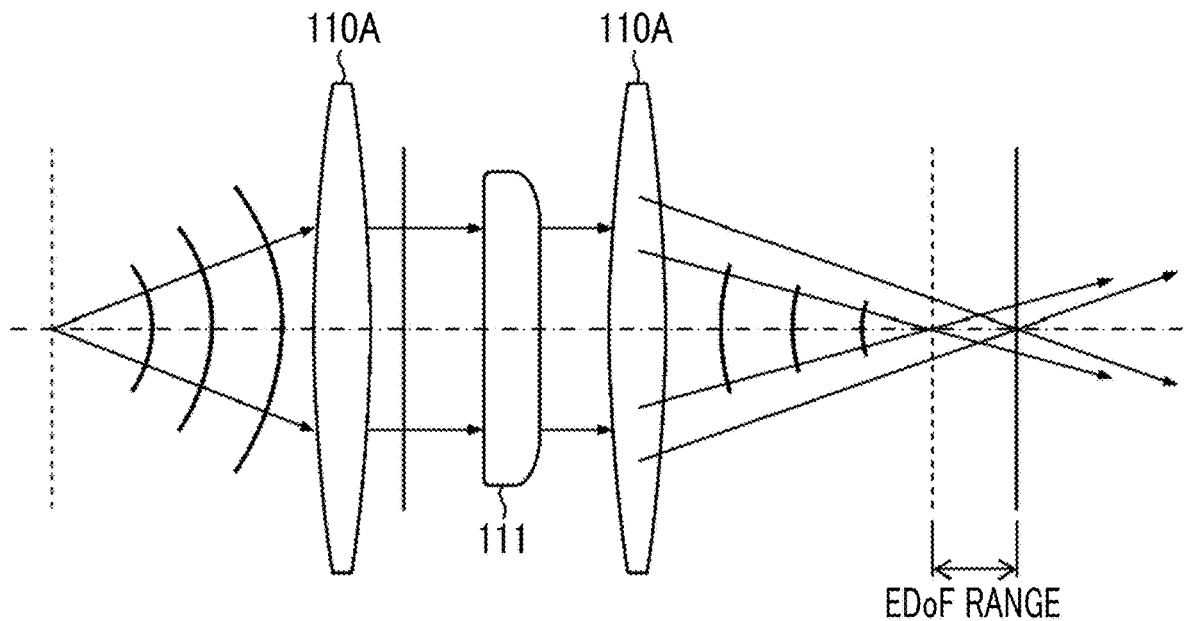
FIG. 16 is a diagram illustrating an example of the EDoF optical system.

FIG. 16 is a diagram illustrating an example of the EDoF optical system 110. The EDoF optical system 110 of the present example has a single-focus fixed imaging lens 110A, and an optical filter 111 disposed at a pupil position. The optical filter 111 modulates a phase, and turns the EDoF optical system 110 (the imaging lens 110A) to EDoF so as to obtain the extended depth of field (depth of focus) (EDoF). In such a manner, the imaging lens 110A and the optical filter 111 constitutes a lens section that modulates the phase and extends the depth of field.

The EDoF optical system 110 includes other components as necessary, and for example, an stop (not shown in the drawing) is disposed near the optical filter ill. Further, the optical filter 111 may be one sheet or a combination of a plurality of sheets. Furthermore, the optical filter 111 is just one example of optical phase modulation means, and turning the EDoF optical system 110 (the imaging lens 110A) to the EDoF may be realized by other means. For example, instead of providing the optical filter 111, turning the EDoF optical system 110 to the EDoF may be realized by the imaging lens 110A designed so as to have a function equivalent to that of the optical filter 111 of the present example.

That is, turning the EDoF optical system 110 to the EDoF can be realized by various kinds of means that change a wavefront of image formation on a light receiving surface of the imaging element 112. For example, the following may be adopted as means of turning the EDoF optical system 110 to the EDoF: "an optical element for which a thickness changes"; "an optical element (a refractive index distribution type wavefront modulation lens or the like) for which a refractive index changes": "an optical element (a wavefront modulation hybrid lens, an optical element formed as a phase surface on a lens surface, or the like) for which the thickness and the refractive index change by coding a lens surface or the like"; or "a liquid crystal element (a liquid crystal space phase modulation element or the like) capable of modulating a phase distribution of light". As described above, the present invention is applicable not only to a case that regularly distributed image formation is possible due to an optical wavefront modulation element (the optical filter 111 (phase plate)) but also to a case that distributed images similar to the case of using the optical wavefront modulation element can be formed by the imaging lens 110A itself without using the optical wavefront modulation element.

The EDoF optical system 110 shown in FIGS. 15 and 16 can be miniaturized since a focus adjusting mechanism that mechanically adjusts a focus can be omitted, and can be suitably mounted on a cellular phone with a camera or a portable information terminal.

An optical image after passing through the EDoF optical system 110 turned to the EDoF is formed on the imaging element 112 shown in FIG. 15 and converted into an electric signal here.

The imaging element 112 is composed of a plurality of pixels arranged in a matrix shape by a predetermined pattern array (such as a Bayer array, a G stripe R/G full checkered pattern (checker flag), or a honeycomb array). Each pixel includes a microlens, a color filter (an RGB color filter in the present example) and a photodiode. The optical image made incident on the light receiving surface of the imaging element 112 through the EDoF optical system 110 is converted into signal charges of an amount corresponding to an amount of incident light by the respective photodiodes arrayed on the light receiving surface. Then, R, CG, and B signal charges stored in the respective photodiodes are sequentially output as voltage signals (image signals) of the respective pixels.

The AD conversion section 114 converts analog R, G, and B image signals which are output for the respective pixels from the imaging element 112 to digital RGB image signals. The digital image signals converted to the digital image signals by the AD conversion section 114 are added to a restoration processing block 120.

The restoration processing block 120 includes, for example, a black level adjustment section 122, a white balance gain section 123, a gamma processing section 124, a demosaic processing section 125, an RGB/YCrCb conversion section 126, and a Y signal restoration processing section 127.

The black level adjustment section 122 executes black level adjustment on the digital image signals which are output from the AD conversion section 114. For the black level adjustment, a known method may be adopted. For example, in the case of paying attention to a certain effective photoelectric conversion element, by obtaining an average of dark-current-amount acquisition signals corresponding to each of a plurality of OB photoelectric conversion elements included in a photoelectric conversion element row including the effective photoelectric conversion element, and subtracting the average from the dark-current-amount acquisition signals corresponding to the effective photoelectric conversion element, a black level is adjusted.

The white balance gain section 123 performs gain adjustment according to a white balance gain of the individual RGB chrominance signals included in the digital image signals for which black level data is adjusted.

The gamma processing section 124 performs gamma correction of correcting a gradation of a halftone or the like so as to adjust the white-balance-adjusted R, G and B image signals to have desired gamma characteristics.

The demosaic processing section 125 applies the demosaic processing to the R, G and B image signals obtained after the gamma correction. Specifically, the demosaic processing section 125 generates a set of image signals (R signal, G signal, B signal) to be output from individual light receiving pixels of the imaging element 112 by applying color interpolation processing to the R, G and B image signals. That is, while pixel signals from the individual light receiving pixels are one of the R, G and B image signals before color demosaic processing, the set of three pixel signals, which are R, G and B signals corresponding to the individual light receiving pixels, is output after the color demosaic processing.

The RGB/YCrCb conversion section 126 converts the demosaic-processed R, G and B signals of the respective pixels into a luminance signal Y and color difference signals Cr and Cb, and outputs the luminance signal Y and the color difference signals Cr and Cb of the respective pixels.

The Y signal restoration processing section 127 performs the restoration processing on the luminance signal Y, which is sent from the RGB/YCrCb conversion section 126, on the basis of the restoration filter stored in advance. The restoration filter consists of, for example, a deconvolution kernel (corresponding to the number of taps of M=7 and N=7) having a kernel size of 7×7 and calculation coefficients (corresponding to restoration gain data and the filter coefficient) corresponding to the deconvolution kernel, and is used for deconvolution processing (inverse convolution calculation processing) for phase modulation of the optical filter 111. In addition, for the restoration filter, the one corresponding to the optical filter 111 is stored in a memory (for example, a memory where the Y signal restoration processing section 127 is incidentally provided) not shown in the drawing. Further, the kernel size of the deconvolution kernel is not limited to 7×7.

Figure 17:
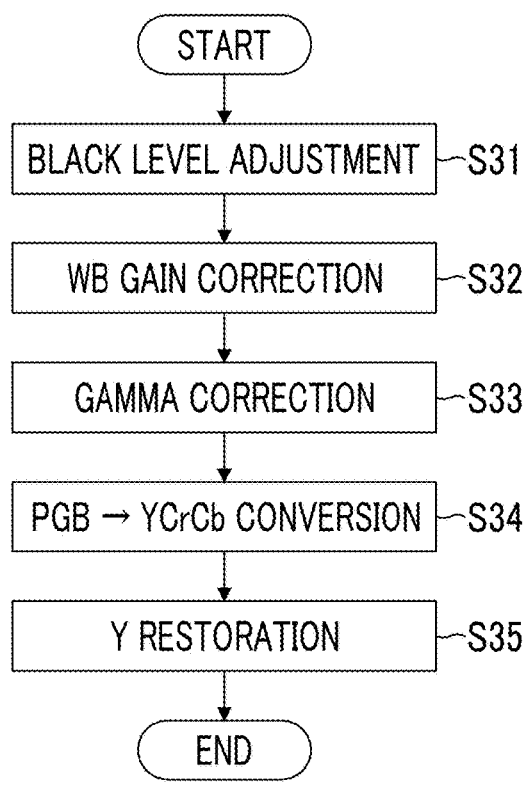
FIG. 17 is a diagram illustrating an example of a flow of restoration processing performed by a restoration processing blocks shown in FIG. 15.

Next, the restoration processing performed by the restoration processing block 120 will be described. FIG. 17 is a flowchart illustrating an example of the restoration processing in the restoration processing block 120 shown in FIG. 15.

The digital image signals are added from the AD conversion section 114 to one input of the black level adjustment section 122, the black level data is added to the other input, and the black level adjustment section 122 subtracts the black level data from the digital image signals and outputs the digital image signals, from which the black level data is subtracted, to the white balance gain section 123 (S31). Thereby, black level components are not included in the digital image signals, and the digital image signal, which indicates a black level, becomes 0.

Processing by the white balance gain section 123 and the gamma processing section 124 is sequentially performed on the image data obtained after the black level adjustment (S32 and S33).

The gamma-corrected R, G and B signals are subjected to the demosaic processing through the demosaic processing section 125, and then converted into the luminance signal Y and color difference signals Cr and Cb in the RGB/YCrCb conversion section 126 (S34).

The Y signal restoration processing section 127 performs the restoration processing of applying the deconvolution processing for the phase modulation of the optical filter 111 of the EDoF optical system 110 to the luminance signal Y (S35). That is, the Y signal restoration processing section 127 performs the deconvolution processing (inverse convolution calculation processing) of the luminance signals (the luminance signals of 7×7 pixels here) corresponding to a pixel group of a predetermined unit with an arbitrary processing target pixel as the center and the restoration filter (the 7×7 deconvolution kernel and the calculation coefficient thereof) stored in advance in the memory or the like. The Y signal restoration processing section 127 performs the restoration processing of removing an image blur of the entire image by repeating the deconvolution processing for each pixel group of the predetermined unit so as to cover the entire area of the imaging surface. The restoration filter is determined in accordance with a position of the center of the pixel group to which the deconvolution processing is applied. That is, a common restoration filter is applied to adjacent pixel groups. In order to simplify the restoration processing further, it is preferable to apply a common restoration filter to all the pixel groups.

Figure 18:
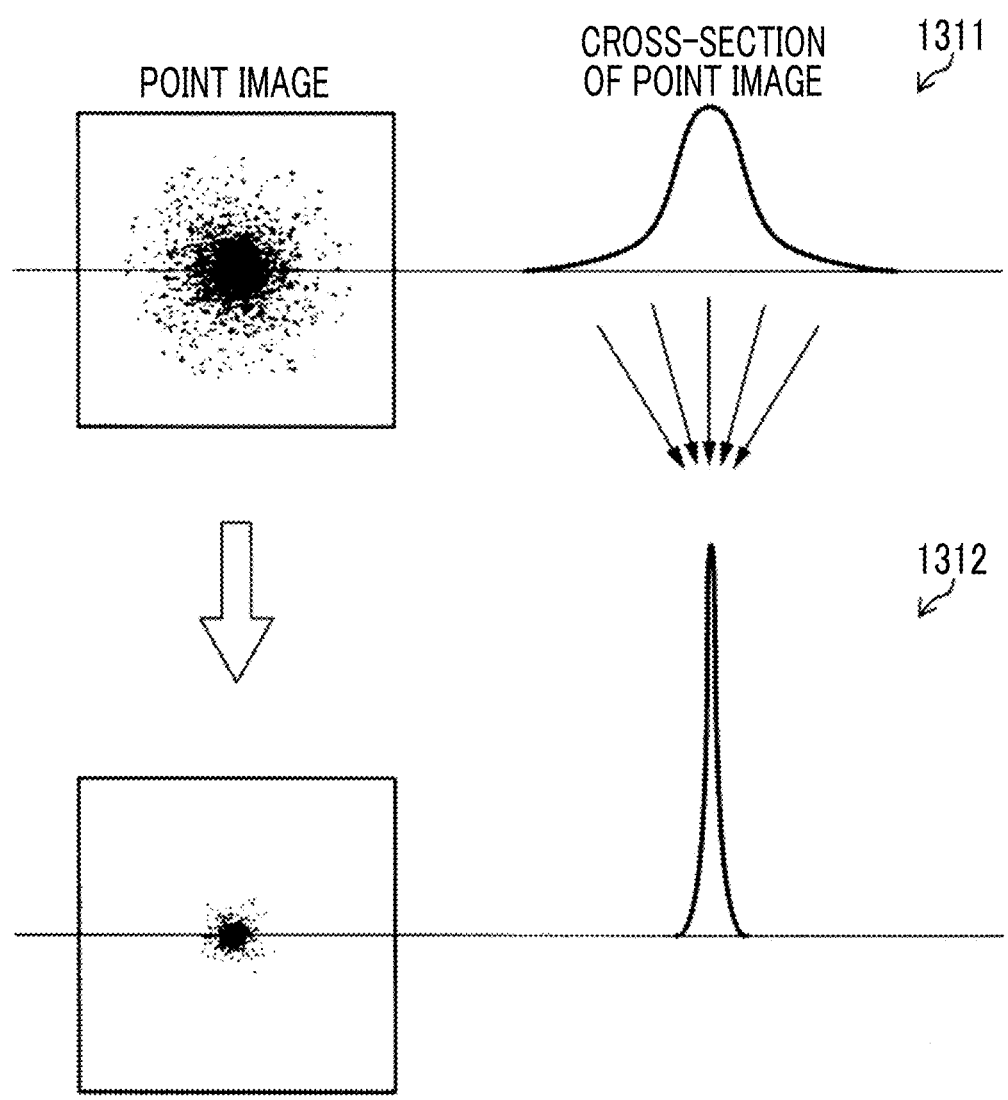
FIG. 18 is a diagram illustrating an example of restoration of an image acquired through the EDoF optical system.

As indicated by the reference numeral of 1311 of FIG. 18, a point image (optical image) of the luminance signals after passing through the EDoF optical system 110 is formed on the imaging element 112 as a large point image (blurred image), but is restored to a small point image (high resolution image) through the deconvolution processing in the Y signal restoration processing section 127 as indicated by the reference numeral of 1312 of FIG. 18.

As described above, by applying the restoration processing to the luminance signals obtained after the demosaic processing, the need fors having a parameter of the restoration processing separately for R, G and B is eliminated, and the restoration processing can be accelerated. Further, without gathering the R, G and B image signals corresponding to the R, G, and B pixels at scattered positions into one unit respectively to perform the deconvolution processing, the luminance signals of adjacent pixels are gathered into the predetermined unit, the common restoration filter is applied to the unit and the deconvolution processing is performed, so that the accuracy of the restoration processing is improved. Furthermore, from the viewpoint of characteristics of vision by human eyes, the color difference signals Cr, Cb are allowed in terms of image quality without increasing a resolution through the restoration processing. In addition, in the case of recording the image by a compression format like JPEG the color difference signals are compressed with a higher compressibility than that for the luminance signals. Therefore, it is less necessary to increase the resolution through the restoration processing. In such a manner, the restoration accuracy can be improved and the processing can be simplified and accelerated compatibly.

Further, embodiments, to which the present invention can be applied, are not limited to the digital camera 10, the computer 60 and the server 80. The present invention also can be applied to not only cameras that mainly have an imaging function but also mobile equipment that has not only an imaging function but also functions (a phone call function, a communication function, and other computer functions) other than the imaging function. Examples of the embodiments, to which the present invention can be applied, include a mobile phone having a camera function, a smartphone, a personal digital assistant (PDA), and a portable game machine. Hereinafter, an example of a smartphone, to which the present invention is applicable, will be described.

<Configuration of Smartphone>

Figure 19:
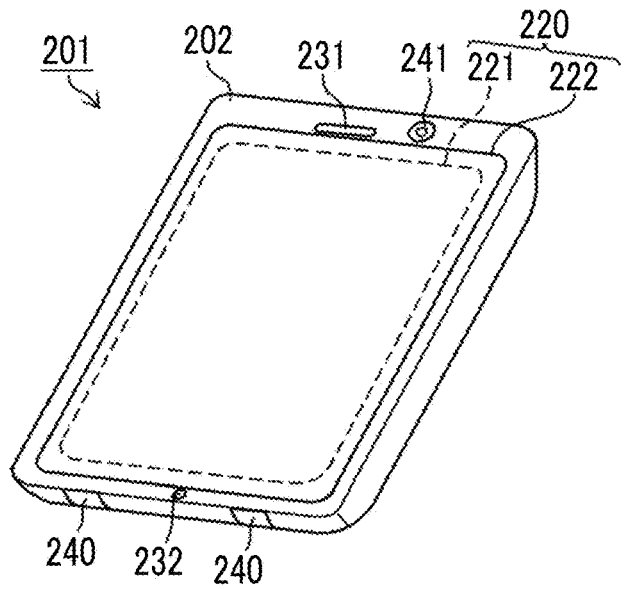
FIG. 19 is a diagram illustrating an appearance of a smartphone which is an embodiment of an imaging apparatus of the present invention.

FIG. 19 shows an appearance of a smartphone 201 as the imaging device according to the embodiment of the present invention. The smartphone 201 shown in FIG. 19 includes: a housing 202 that has a flat plate shape; a display panel 221 as a display section on one side of the housing 202; and a display input section 220 into which an operation panel 222 as an input section is integrated. Further, the housing 202 includes a speaker 231, a microphone 232, operation sections 240, and a camera section 241. It should be noted that the configuration of the housing 202 is not limited to this. For example, it may be possible to adopt a configuration in which the input section and the display section are independent, or it may be possible to adopt a configuration having a slide mechanism or a folded structure.

Figure 20:
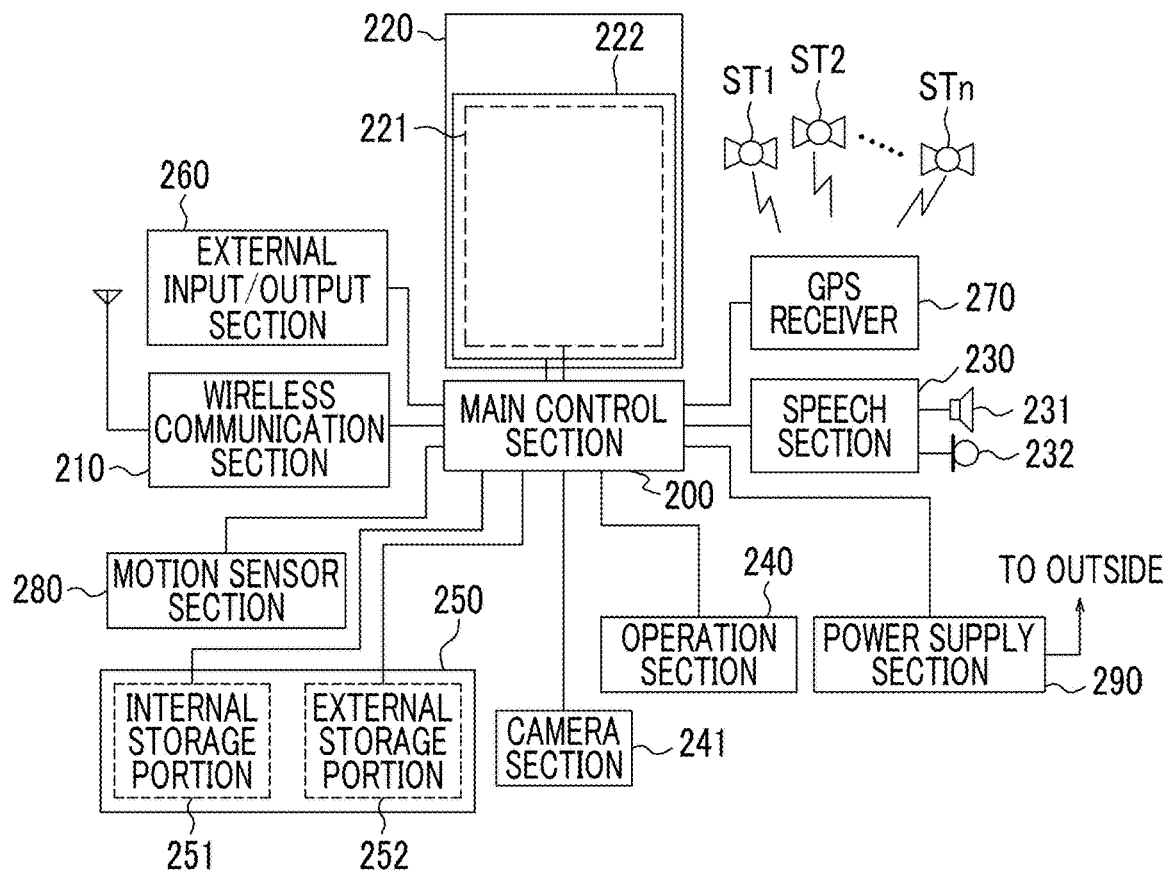
FIG. 20 is a block diagram illustrating a configuration of the smartphone shown in FIG. 19.

FIG. 20 is a block diagram illustrating a configuration of the smartphone 201 shown in FIG. 19. As shown in FIG. 20, the smartphone comprises, as main components, a wireless communication section 210, a display input section 220, a speech section 230, the operation sections 240, the camera section 241, a storage section 250, an external input/output section 260, a global positioning system (GPS) receiver 270, a motion sensor section 280, a power supply section 290, and a main control section 200. Further, as the main function of the smartphone 201, there is provided a wireless communication function for performing mobile wireless communication with a base station device BS through a mobile communication network NW.

The wireless communication section 210 performs wireless communication with the base station device BS, which is included in the mobile communication network NW, in accordance with an instruction of the main control section 200. Using such wireless communication, various kinds of file data such as audio data and image data, e-mail data, and the like are transmitted and received, and web data, streaming data, and the like are received.

The display input section 220 is a so-called touch panel, and includes the display panel 221 and the operation panel 222. The touch panel displays image (still image and moving image) information or text information so as to visually transfer the information to a user in accordance with control of the main control section 200, and detects a user operation on the displayed information.

The display panel 221 uses a liquid crystal display (LCD), an organic electro-luminescence display (OELD), or the like as a display device. The operation panel 222 is a device that is provided for viewing an image which is displayed on a display screen of the display panel 221 and that detects a single pair of coordinates or a plurality of pairs of coordinates at which an operation is performed by a user's finger or a stylus. When such a device is operated by a user's finger or a stylus, the device outputs a detection signal, which is generated due to the operation, to the main control section 200. Subsequently, the main control section 200 detects an operation position (coordinates) on the display panel 221, on the basis of the received detection signal.

As shown in FIG. 19, the display panel 221 and the operation panel 222 of the smartphone 201, which is exemplified as the imaging apparatus according to the above-mentioned embodiment of the present invention, are integrated, constitute the display input section 220, and are disposed such that the operation panel 222 completely covers the display panel 221. When such an arrangement is adopted, the operation panel 222 may have a function of also detecting a user operation in an area other than the display panel 221. In other words, the operation panel 222 may comprise a detection region (hereinafter referred to as a display region) for a part which overlaps with the display panel 221 and a detection region (hereinafter referred to as a non-display region) for the other part at the outer edge which does not overlap with the display panel 221.

It should be noted that a size of the display region and a size of the display panel 221 may completely coincide with each other, but it is not always necessary for both to coincide with each other. Further, the operation panel 222 may include two sensing regions of the outer edge part and the other inside part. Furthermore, a width of the outer edge part is appropriately designed depending on a size of the housing 202 and the like. In addition, examples of the position detection method adopted by the operation panel 222 may include a matrix switch method, a resistance film method, a surface elastic wave method, an infrared method, an electromagnetic induction method, and an electrostatic capacitance method, and the like, and any method may be adopted.

The speech section 230 comprises a speaker 231 and a microphone 232. The speech section 230 converts a sound of a user, which is input through the microphone 232, into sound data, which can be processed in the main control section 200, and outputs the data to the main control section 200, or decodes sound data, which is received by the wireless communication section 210 or the external input/output section 260, and outputs the data from the speaker 231. Further, as shown in FIG. 19, for example, the speaker 231 can be mounted on the same surface as the surface on which the display input section 220 is provided. In addition, the microphone 232 can be mounted on a side surface of the housing 202.

The operation section 240 is a hardware key using a key switch or the like, and receives an instruction from a user. For example, as shown in FIG. 19, the operation sections 240 are button type switches which are mounted on the side surface of the housing 202 of the smartphone 201. Each switch is turned on if it is pressed by a finger or the like, and is turned off due to restoring force of a spring if the finger is released.

The storage section 250 stores a control program and control data of the main control section 200, application software, address data in which names, phone numbers, and the like of communication partners are associated, received and transmitted e-mail data, web data which is downloaded by web browsing, and downloaded contents data, and temporarily stores streaming data and the like. Further, the storage section 250 is constituted of an internal storage portion 251, which is built into the smartphone, and an external storage portion 252 which has a removable external memory slot. In addition, each of the internal storage portion 251 and the external storage portion 252 constituting the storage section 250 is implemented by using a storage medium such as a flash memory type, a hard disk type, a multimedia card micro type, a card type memory (such as a MicroSD (registered trademark) memory), a random access memory (RAM), or a read only memory (ROM).

The external input/output section 260 has a function of an interface with all external devices connected to the smartphone 201. The external input/output section 260 is for communication (such as Universal Serial Bus (USB) or IEEE1394) with other external devices, direct or indirect connection to networks (such as the Internet, wireless LAN, Bluetooth (registered trademark), radio frequency identification (RFID), infrared communication (Infrared Data Association: IrDA) (registered trademark), ultra wideband (UWB) (registered trademark), and ZigBee (registered trademark)), or the like.

Examples of the external devices connected to the smartphone 201 include a wired/wireless headset, a wired/wireless external charger, a wired/wireless data port, a memory card which is connected through a card socket, a subscriber identity module (SIM) or user identity module (UIM) card, external audio and video devices which are connected through audio and video input/output (I/O) terminals, external audio and video devices which are connected in a wireless manner, a smartphone which is connected in a wired or wireless manner, a personal computer which is connected in a wired or wireless manner, a PDA which is connected in a wired or wireless manner, an earphone, and the like. The external input/output section may transfer the data, which is transmitted from such external devices, to the components within the smartphone 201, and to transmit the data within the smartphone 201 to the external devices.

The GPS receiver 270 receives a plurality of GPS signals, which are transmitted from GPS satellites ST1 to STn, in accordance with instructions of the main control section 200, executes positioning calculation processing based on the received GPS signals, and detects a position formed of a latitude, a longitude, and an altitude of the smartphone 201. The GPS receiver 270 may detect the position by using position information when it is possible to acquire the position information from the wireless communication section 210 or the external input/output section 260 (for example, wireless LAN).

The motion sensor section 280 includes, for example, a triaxial acceleration sensor, and detects physical movement of the smartphone 201, in accordance with an instruction of the main control section 200. By detecting physical movement of the smartphone 201, an acceleration and a direction of the movement of the smartphone 201 are detected. Such a detection result is output to the main control section 200.

The power supply section 290 supplies the respective sections of the smartphone 201 with electric power, which is stored in a battery (not shown), in accordance with an instruction of the main control section 200.

The main control section 200 comprises a micro processor, and integrally controls the respective sections of the smartphone 201 by performing an operation on the basis of control data or a control program stored in the storage section 250. Further, the main control section 200 has an application processing function and a mobile communication control function of controlling the respective sections of a communication system in order to perform data communication and sound communication through the wireless communication section 210.

The application processing function is implemented by an operation of the main control section 200 using application software stored in the storage section 250. Examples of the application processing function include: an infrared communication function of performing data communication with other devices by controlling the external input/output section 260: an e-mail function of transmitting and receiving e-mails; a web browsing function of browsing web pages: and the like.

Further, the main control section 20X) has an image processing function of displaying a video on the display input section 220 and the like, on the basis of image data (still image and moving image data) such as received data and downloaded streaming data. The image processing function means a function of causing the main control section 200 to decode the image data, apply image processing to the corresponding decoding result, and display an image on the display input section 220.

Further, the main control section 200 executes display control for the display panel 221 and operation detection control to detect the user operation through the operation sections 240 and the operation panel 222.

Through execution of the display control, the main control section 200 displays an icon for activating application software and a window for displaying a software key such as a scroll bar or creating an e-mail. It should be noted that the scroll bar means a software key for receiving an instruction to move a display portion of an image on a large image which cannot be entirely shown in the display region of the display panel 221.

Further, through execution of the operation detection control, the main control section 200 detects the user operation performed through the operation section 240, receives an operation performed on the icon or an input of the software key through the operation panel 222, or receives a request to scroll a displayed image through the scroll bar.

Furthermore, the main control section 200 has a touch panel control function performed through execution of the operation detection control. The function determines whether the operation position of the operation panel 222 is in the overlapping part (display region) which overlaps with the display panel 221 or the other part (non-display region) at the outer edge which does not overlap with the display panel 221, and controls the display position of the software key or the sensing region of the operation panel 222.

In addition, the main control section 200 may detect a gesture operation performed on the operation panel 222, and may execute a preset function in response to the detected gesture operation. The gesture operation is not a simple touch operation used in the past. The gesture operation means an operation for drawing a locus with a finger or the like, an operation of specifying a plurality of positions at the same time, or an operation of drawing loci from a plurality of positions to at least one position as a combination of the above-mentioned operations.

The camera section 241 is a digital camera for performing electronic imaging by using the imaging element such as a complementary metal oxide semiconductor (CMOS) or a charge-coupled device (CCD). Further, under the control of the main control section 200, the camera section 241 is able to convert the image data, which is obtained through image capturing, into compressed image data such as data of a joint photographic coding experts group (JPEG), and to record the data in the storage section 250 or to output the data through the external input/output section 260 or the wireless communication section 210. In the smartphone 201 shown in FIG. 19, the camera section 241 is mounted on the same side as the display input section 220. However, the mounting position of the camera section 241 is not limited to this. The camera section 241 may be mounted on the rear side of the display input section 220, or a plurality of camera sections 241 may be mounted. In addition, in the case where the plurality of camera sections 241 is mounted, imaging may be performed using a single camera section 241 by selecting the camera section 241 for the imaging, or imaging may be performed using the plurality of camera sections 241 at the same time.

Further, the camera section 241 can be used in various functions of the smartphone 201. For example, an image, which is acquired by the camera section 241, can be displayed on the display panel 221, and an image of the camera section 241 can be used for one of the operation inputs of the operation panel 222. Further, when the GPS receiver 270 detects a position, the GPS receiver 370 may detect the position with reference to an image obtained from the camera section 241. Furthermore, it may be possible to determine a direction of an optical axis of the camera section 241 of the smartphone 201 or determine a current user environment, using the GPS receiver 214 in a combination with the triaxial acceleration sensor or without using the triaxial acceleration sensor, with reference to the image acquired from the camera section 241. Needless to say, the image acquired from the camera section 241 may be used in the application software.

Otherwise, the position information acquired by the GPS receiver 270, the sound information acquired by the microphone 232 (or text information obtained through sound text conversion performed by the main control section or the like), the posture information acquired by the motion sensor section 280, and the like may be added to the image data of the still image or the moving image, and the image data may be recorded in the storage section 250, or may be output through the external input/output section 260 or the wireless communication section 210.

In addition, each function in the above-mentioned image processing section 35 described in FIG. 3 is implemented by, for example, the main control section 200.

Although the present invention has been described with reference to the examples, it is apparent that the present invention is not limited to the above-mentioned embodiments, and may be modified into various forms without departing from the scope of the present invention.

EXPLANATION OF REFERENCES

- 10: digital camera
- 12: lens unit
- 14: camera body
- 16: lens
- 17: stop
- 26: imaging element
- 28: camera body controller
- 34: device control section
- 35: image processing section
- 40: image acquisition section
- 41: second image generation section
- 42: resolution enhancement processing section
- 43: third image generation section
- 44: distortion correction section

What is claimed is:

1. An image processing device comprising:
   an image acquisition section that acquires a first image which is acquired from an imaging element by imaging a subject image using an optical system;
   a second image generation section that generates a second image which is developed as a panorama by performing polar coordinate transformation on the first image acquired by the image acquisition section, wherein the sagittal direction and the tangential direction of the first image correspond to the horizontal direction and the vertical direction of the second image such that the tangential direction and the sagittal direction of the first image and the vertical direction and the horizontal direction of the second image are aligned; and
   a resolution enhancement processing section that performs resolution enhancement processing on the second image asymmetrically in the horizontal direction and the vertical direction of the second image,
   wherein the resolution enhancement processing section performs the resolution enhancement processing on only a partial area of the second image in the vertical direction.

2. An image processing device comprising:
   an image acquisition section that acquires a first image which is acquired from an imaging element by imaging a subject image using an optical system;
   a second image generation section that generates a second image which is developed as a panorama by performing polar coordinate transformation on the first image acquired by the image acquisition section, wherein the sagittal direction and the tangential direction of the first image correspond to the horizontal direction and the vertical direction of the second image such that the tangential direction and the sagittal direction of the first image and the vertical direction and the horizontal direction of the second image are aligned; and
   a resolution enhancement processing section that performs resolution enhancement processing on the second image asymmetrically in the horizontal direction and the vertical direction of the second image,
   wherein the resolution enhancement processing section changes a level of enhancement of the resolution enhancement processing in accordance with a position of the second image in the vertical direction.

3. The image processing device according to claim 2, wherein the resolution enhancement processing section reduces the level of enhancement of the resolution enhancement processing in accordance with the position of the second image in the vertical direction.

4. The image processing device according to claim 1, wherein the resolution enhancement processing, which is performed by the resolution enhancement processing section, is recovery processing using a recovery filter corresponding to the second image on the basis of a point spread function of the optical system.

5. The image processing device according to claim 1, wherein the resolution enhancement processing, which is performed by the resolution enhancement processing section, is outline enhancement processing using an outline enhancement filter.

6. The image processing device according to claim 1, wherein a lens composing the optical system is a fish-eye lens.

7. The image processing device according to claim 6, further comprising
   a distortion correction section that performs distortion correction on the second image,
   wherein the resolution enhancement processing section performs resolution enhancement processing on the second image, which is subjected to the distortion correction, asymmetrically in the horizontal direction and the vertical direction of the second image.

8. The image processing device according to claim 1, further comprising a third image generation section that performs reverse panorama development, which is reverse processing of the panorama development performed by the second image generation section, on the second image so as to generate a third image.

9. An image processing method comprising:
an image acquisition step of acquiring a first image which is acquired from an imaging element by imaging a subject image using an optical system;
a second image generation step of generating a second image which is developed as a panorama by performing polar coordinate transformation on the first image acquired by the image acquisition step, wherein the sagittal direction and the tangential direction of the first image correspond to the horizontal direction and the vertical direction of the second image such that the tangential direction and the sagittal direction of the first image and the vertical direction and the horizontal direction of the second image are aligned; and
a resolution enhancement processing step of performing resolution enhancement processing on the second image asymmetrically in the horizontal direction and the vertical direction of the second image,
wherein the resolution enhancement processing step performs the resolution enhancement processing on only a partial area of the second image in the vertical direction.

10. A non-transitory computer-readable tangible medium recording a program causing a computer to execute the image processing method according to claim 9.

11. An image processing method comprising:
an image acquisition step of acquiring a first image which is acquired from an imaging element by imaging a subject image using an optical system;
a second image generation step of generating a second image which is developed as a panorama by performing polar coordinate transformation on the first image acquired by the image acquisition step, wherein the sagittal direction and the tangential direction of the first image correspond to the horizontal direction and the vertical direction of the second image such that the tangential direction and the sagittal direction of the first image and the vertical direction and the horizontal direction of the second image are aligned; and
a resolution enhancement processing step of performing resolution enhancement processing on the second image asymmetrically in the horizontal direction and the vertical direction of the second image,
wherein the resolution enhancement processing step changes a level of enhancement of the resolution enhancement processing in accordance with a position of the second image in the vertical direction.

12. A non-transitory computer-readable tangible medium recording a program causing a computer to execute the image processing method according to claim 11.

* * * * *